(12) United States Patent
Suzuki et al.

(10) Patent No.: US 12,259,101 B2
(45) Date of Patent: Mar. 25, 2025

(54) VEHICULAR LAMP

(71) Applicant: KOITO MANUFACTURING CO., LTD., Tokyo (JP)

(72) Inventors: Takahiro Suzuki, Shizuoka (JP); Takaya Shimizu, Shizuoka (JP); Toshiyuki Fujimura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/280,039

(22) PCT Filed: Feb. 18, 2022

(86) PCT No.: PCT/JP2022/006603
§ 371 (c)(1),
(2) Date: Sep. 1, 2023

(87) PCT Pub. No.: WO2022/185949
PCT Pub. Date: Sep. 9, 2022

(65) Prior Publication Data
US 2024/0151379 A1    May 9, 2024

(30) Foreign Application Priority Data

Mar. 3, 2021  (JP) .................................. 2021-033900
Mar. 3, 2021  (JP) .................................. 2021-033901
(Continued)

(51) Int. Cl.
*F21S 41/36*     (2018.01)
*F21S 41/26*     (2018.01)
(Continued)

(52) U.S. Cl.
CPC ............... *F21S 41/36* (2018.01); *F21S 41/26* (2018.01); *F21S 45/47* (2018.01); *F21W 2102/30* (2018.01)

(58) Field of Classification Search
CPC ........ F21S 41/36; F21S 41/321; F21S 41/323; F21S 41/334; F21S 41/37; F21S 41/335;
(Continued)

(56) References Cited

U.S. PATENT DOCUMENTS 1,306,511 A * 6/1919 Ames ....................... F21V 7/09
                                                    362/346
1,792,848 A * 2/1931 Hunt ..................... F21S 41/337
                                                    362/348
(Continued)

FOREIGN PATENT DOCUMENTS

CN       102032493 A  *  4/2011
CN       207555475 U      6/2018
(Continued)

OTHER PUBLICATIONS

Search English translation of CN-102032493-A (Year: 2011).*
(Continued)

*Primary Examiner* — Omar Rojas Cadima
(74) *Attorney, Agent, or Firm* — Osha Bergman Watanabe & Burton LLP

(57) ABSTRACT

A vehicular lamp includes a light source, a reflector, and a projection lens. The vehicular lamp is configured to radiate, toward front of the lamp via the projection lens, light from the light source, the light being reflected by the reflector. A reflective surface of the reflector includes a reflective region configured to illuminate a short-distance road surface within 5 m in front of the lamp. A light diffusing treatment for diffusing and reflecting emitted light from the light source is applied to the reflective region.

4 Claims, 20 Drawing Sheets

(30) Foreign Application Priority Data

Mar. 3, 2021 (JP) ................................ 2021-033902
Mar. 3, 2021 (JP) ................................ 2021-033903

(51) Int. Cl.
  *F21S 45/47* (2018.01)
  *F21W 102/30* (2018.01)

(58) Field of Classification Search
  CPC ........ F21S 41/336; F21S 41/337; B62J 6/022;
        F21W 2102/13; B60Q 1/22; B60Q 1/247;
                  B60Q 2300/45; B60Q 2300/324
  See application file for complete search history.

(56) References Cited

U.S. PATENT DOCUMENTS

| | | |
|---|---|---|
| 2004/0120158 A1 | 6/2004 | Tatsukawa et al. |
| 2008/0239744 A1 | 10/2008 | Nakada et al. |
| 2018/0172231 A1 | 6/2018 | Ugajin et al. |
| 2020/0240606 A1 | 7/2020 | Sato |

FOREIGN PATENT DOCUMENTS

| | | |
|---|---|---|
| JP | 2001-160309 A | 6/2001 |
| JP | 2004-095480 A | 3/2004 |
| JP | 2012094359 A | 5/2012 |
| JP | 2012-204168 A | 10/2012 |
| JP | 2014-175102 A | 9/2014 |
| JP | 2018116869 A | 7/2018 |
| JP | 2019079697 A | 5/2019 |
| JP | 2019-207774 A | 12/2019 |
| JP | 2019-220398 A | 12/2019 |
| JP | 2020-098726 A | 6/2020 |
| JP | 2020-123454 A | 8/2020 |
| JP | 2020-170783 A | 10/2020 |
| JP | 2020-205207 A | 12/2020 |
| WO | 2013-153964 A1 | 10/2013 |

OTHER PUBLICATIONS

International Search Report in corresponding International Application No. PCT/JP2022/006603, dated Apr. 19, 2022 (11 pages).
Written Opinion in corresponding International Application No. PCT/JP2022/006603, dated Apr. 19, 2022 (9 pages).
Partial Supplementary European Search Report issued in counterpart European application No. 22763005.0, dated Feb. 16, 2024 (15 pages).

* cited by examiner

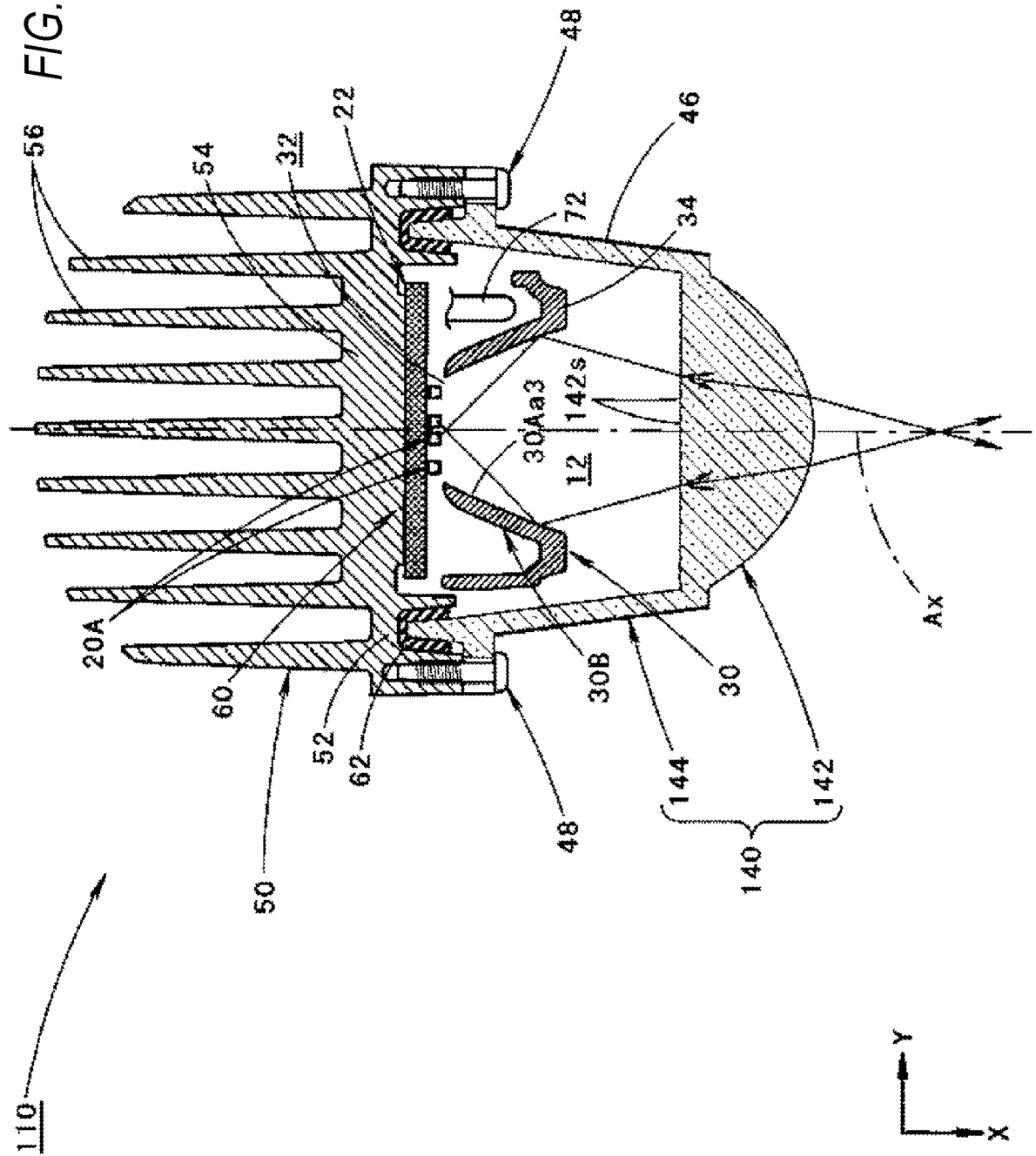

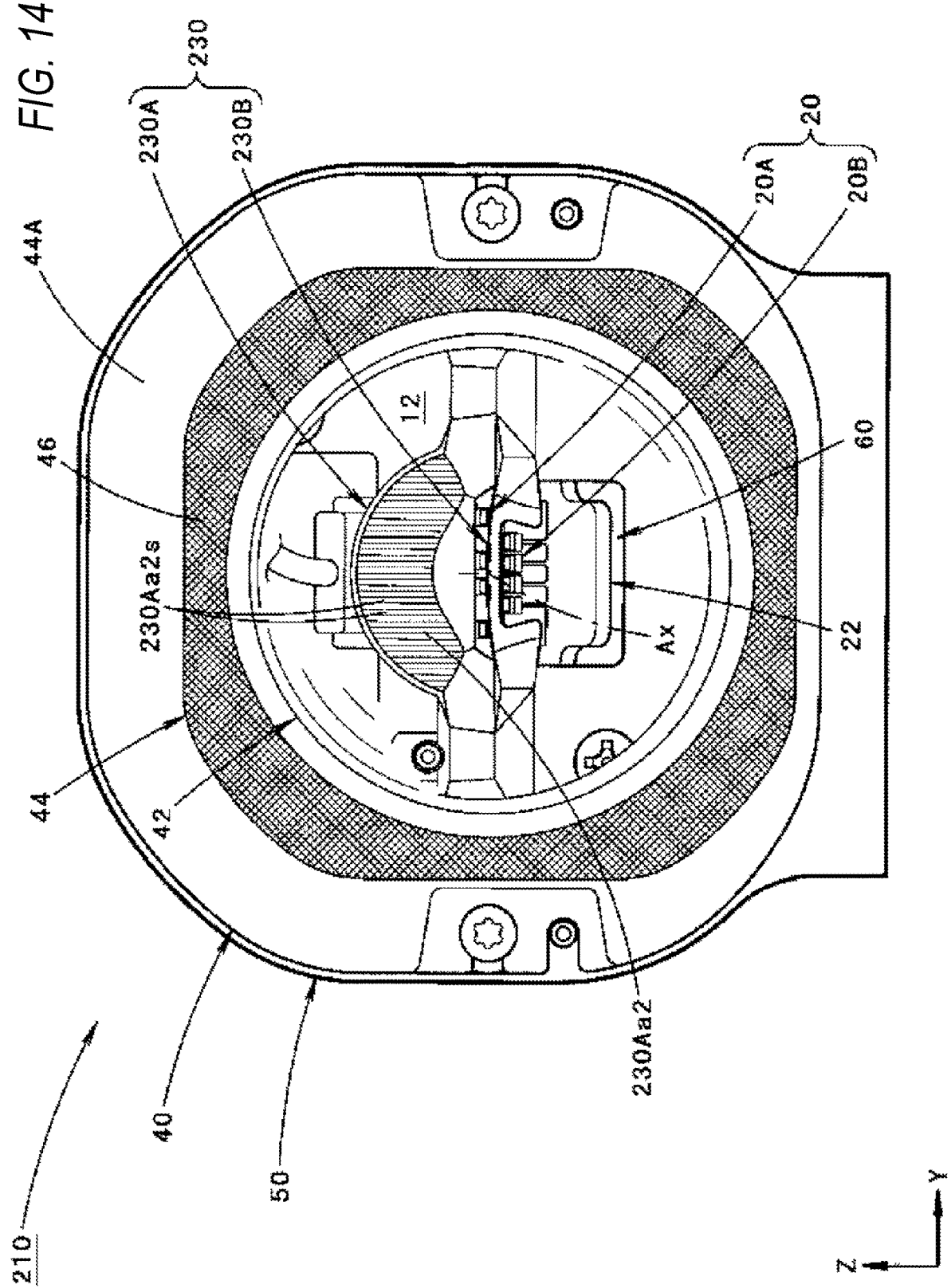

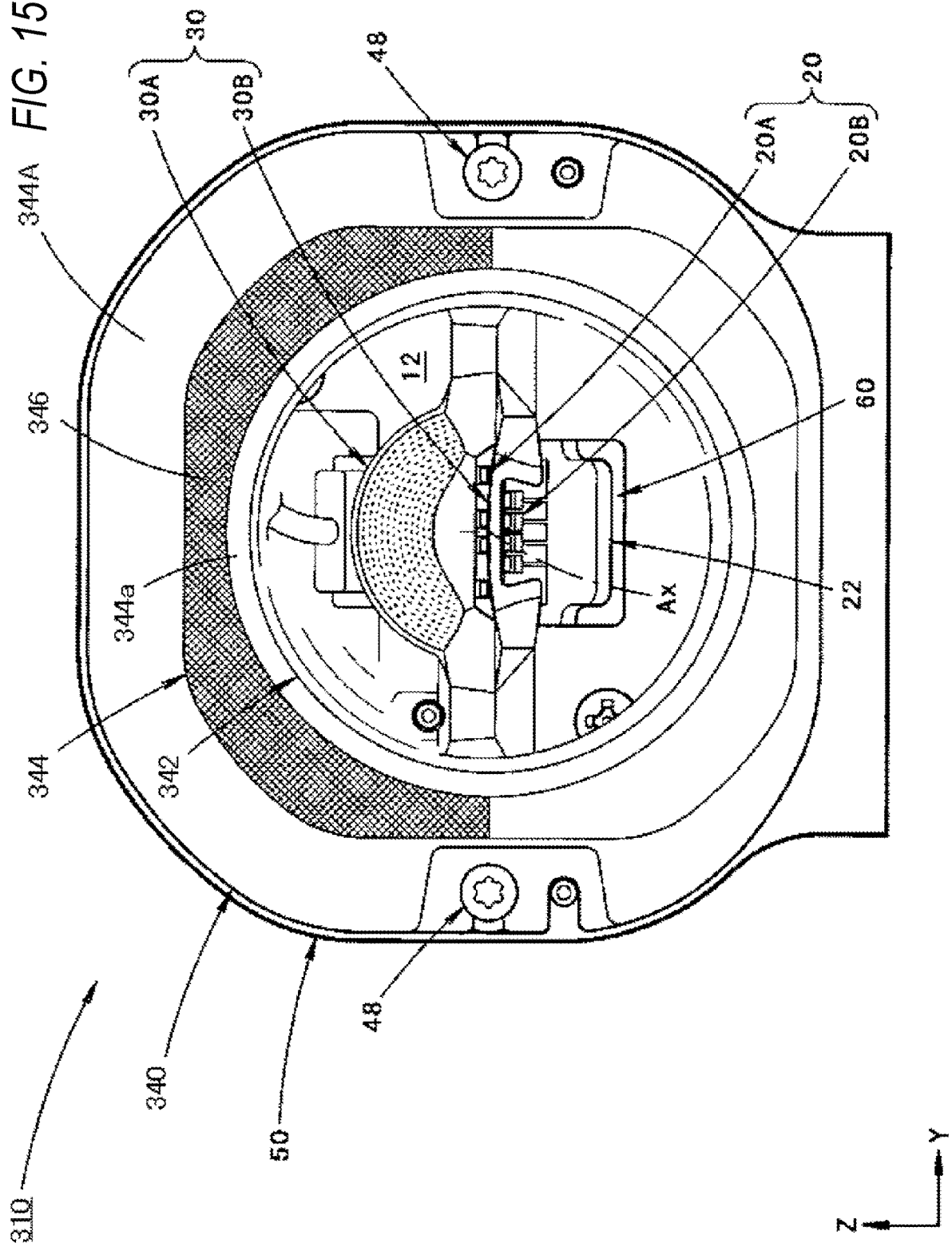

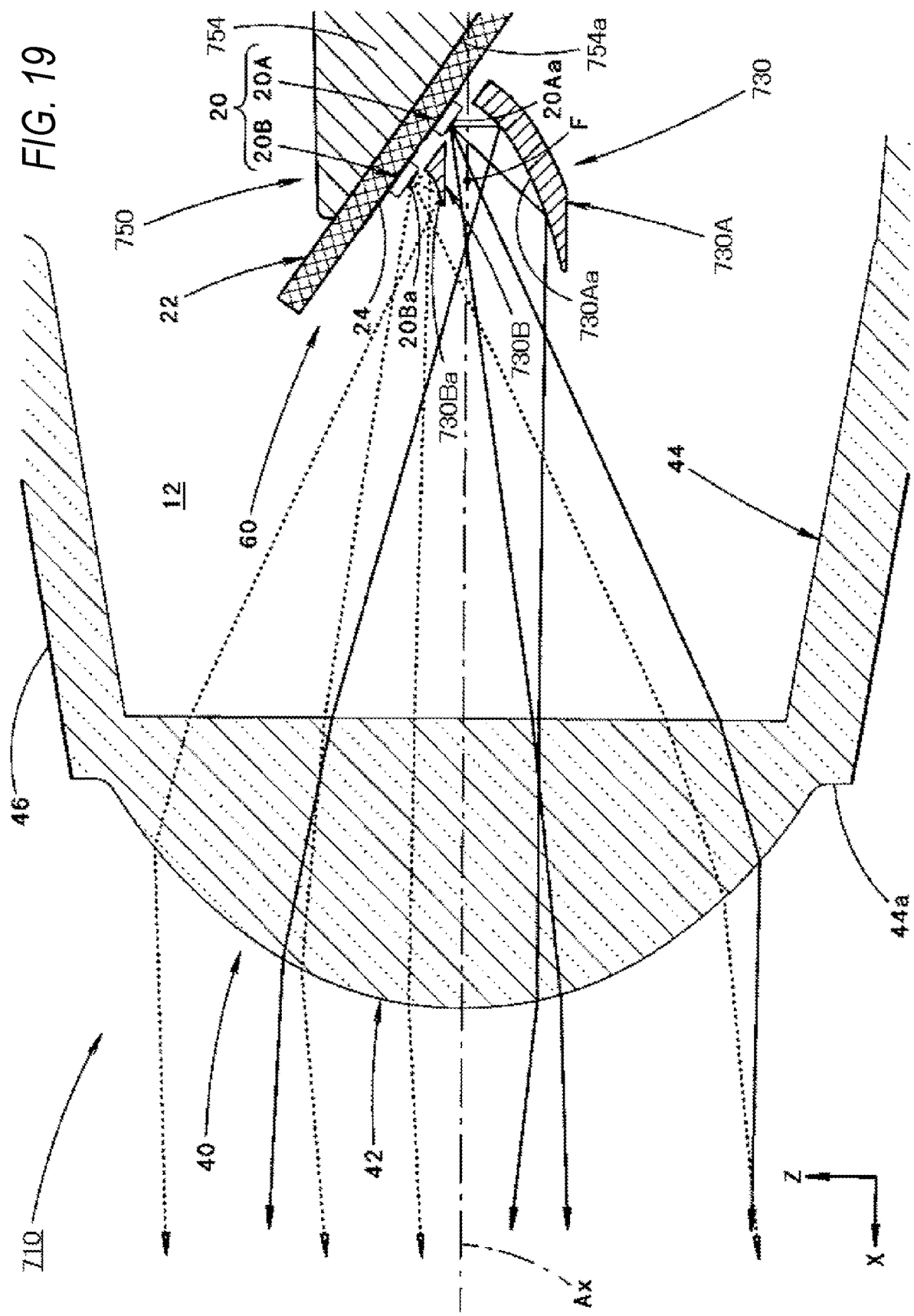

VEHICULAR LAMP

TECHNICAL FIELD

The present invention relates to a vehicular lamp that includes a projection lens.

BACKGROUND ART

In the related art, as a configuration of a vehicular lamp, for example, as described in "Patent Literature 1", a vehicular lamp configured to radiate, toward the front of the lamp via a projection lens, light from a light source, which is reflected by a reflector, is known.

In addition, as such a vehicular lamp, "Patent Literature 2" describes a vehicular lamp that is configured to make not only reflective light from a reflector but also direct light from a light source incident on a projection lens.

In addition, the vehicular lamp described in "Patent Literature 3" has a configuration in which a projection lens is supported by a light source support member via a bracket unit, and an extension is arranged on a front side of the lamp to surround the projection lens.

CITATION LIST

Patent Literature

Patent Literature 1: JP2004-95480A
Patent Literature 2: JP2019-207774A
Patent Literature 3: WO2013/153964

SUMMARY OF INVENTION

Technical Problem

In a case where the vehicle is a two-wheel vehicle or a four-wheel vehicle such as a one-box car, it is less likely to obstruct a visual field of an occupant as compared with a general sedan type four-wheel vehicle, and thus it is easy to visually recognize a short-distance road surface in front of the lamp.

Therefore, it is desirable that a headlight such as a headlamp or a fog lamp mounted on such a vehicle is capable of illuminating the short-distance road surface in front of the lamp. At this time, it is desired to perform illumination at substantially uniform brightness having small light distribution unevenness as much as possible.

In addition, by adopting, as the vehicular lamp, a configuration provided with an extension as described in "Patent Literature 3" described above, it is possible to prevent the bracket unit supporting the projection lens, the light source, and the like from being seen from the outside of the lamp, and thus it is possible to prevent an appearance of the lamp from being impaired.

However, in the vehicular lamp described in "Patent Literature 3" described above, the extension is required as a cover member for ensuring the appearance, and thus the cost is increased due to an increase in the number of parts, and it is also necessary to ensure a space for the arrangement of the extension.

In addition, in a case where the vehicular lamp has a configuration in which a light emitting surface of a light emitting element is arranged to be inclined obliquely upward or obliquely downward toward the front of the lamp, it is possible to efficiently make not only reflective light from a reflector but also direct light from the light emitting element incident on the projection lens, and thus it is possible to improve lamp efficiency.

In a case where such a configuration is adopted, a substrate on which the light emitting element is mounted is also arranged in an inclined state. However, from the viewpoint of sufficiently ensuring light distribution performance of the lamp, it is desired to adopt a configuration in which the substrate and the reflector are arranged with high positional accuracy with respect to the heat sink.

In addition, FIG. 8 of "Patent Literature 2" shows that such a vehicular lamp includes first and second light emitting elements as the light source, and includes first and second reflectors as the reflector.

The vehicular lamp according to "Patent Literature 2" has a configuration in which the first and second light emitting elements are mounted at an interval in a vertical direction on a front surface of the substrate arranged to extend along a vertical plane orthogonal to a longitudinal direction of the lamp, light from the first light emitting element is reflected by the first reflector, and light from the second light emitting element is reflected by the second reflector.

In order to improve the lamp efficiency, it is desired that such a vehicular lamp has a configuration in which the reflective light from the first and second reflectors and direct light from the first and second light emitting elements are made incident on the projection lens with good balance.

The present invention has been made in view of such circumstances, and an object of the present invention is to provide a vehicular lamp that includes a projection lens and that is capable of illuminating a short-distance road surface in front of the lamp at substantially uniform brightness.

In addition, an object of the present invention is to provide a vehicular lamp that includes a projection lens and that is capable of ensuring an appearance of the lamp by having an inexpensive and compact configuration.

In addition, an object of the present invention is to provide a vehicular lamp that includes a projection lens and that is capable of improving lamp efficiency and then sufficiently securing light distribution performance of the lamp.

In addition, an object of the present invention is to provide a vehicular lamp that includes a projection lens and that is capable of improving lamp efficiency in a case where light from first and second light emitting elements, which is reflected by first and second reflectors, is made incident on the projection lens.

Solution to Problem

The present invention has been made to achieve one of the objects described above by applying a contrivance to a configuration of the reflector.

That is, a vehicular lamp according to the present disclosure includes:
  a light source;
  a reflector; and
  a projection lens,
  in which the vehicular lamp is configured to radiate, toward front of the lamp via the projection lens, light from the light source, the light being reflected by the reflector,
  a reflective surface of the reflector includes a reflective region configured to illuminate a short-distance road surface within 5 m in front of the lamp, and
  a light diffusing treatment for diffusing and reflecting emitted light from the light source is applied to the reflective region.

Further, the present invention has been made to achieve one of the objects described above by applying a contrivance to a configuration of the projection lens.

That is, a vehicular lamp according to the present invention includes:
a light source; and
a projection lens,
in which the vehicular lamp is configured to radiate, toward front of the lamp via the projection lens, light from the light source,
the vehicular lamp includes a light source support member configured to support the light source,
the projection lens includes a tubular portion extending toward rear of the lamp,
the projection lens is supported by the light source support member, at a rear end of the tubular portion, and
a light shielding treatment is applied to at least an upper region of the tubular portion.

Further, a vehicular lamp according to the present invention includes:
a light source;
a reflector; and
a projection lens,
in which the vehicular lamp is configured to radiate, toward front of the lamp via the projection lens, light from the light source, the light being reflected by the reflector,
the reflector and the projection lens are supported by a common heat sink,
the light source includes a light emitting element mounted on a substrate,
the substrate is arranged in a state where a light emitting surface of the light emitting element is inclined obliquely upward toward the front of the lamp or is inclined obliquely downward toward the front of the lamp, and
the substrate is supported by the heat sink in a state where the substrate is pressed, by the reflector, against the heat sink from a front side of the lamp.

Further, the present invention has been made to achieve one of the objects described above by applying a contrivance to a configuration of the substrate and the configuration of the reflector.

That is, a vehicular lamp according to the present invention includes:
a light source;
a reflector; and
a projection lens,
in which the vehicular lamp is configured to radiate, toward front of the lamp via the projection lens, light from the light source, the light being reflected by the reflector,
the vehicular lamp includes, as the light source, a first light emitting element and a second light emitting element that are mounted on a common substrate,
the substrate is arranged in a state where a light emitting surface of each of the first light emitting element and the second light emitting element is inclined obliquely upward toward the front of the lamp or is inclined obliquely downward toward the front of the lamp,
the second light emitting element is arranged at a position away from the first light emitting element to a front side of the lamp,
the vehicular lamp includes, as the reflector:
a first reflector configured to reflect, toward the projection lens, emitted light from the first light emitting element; and
a second reflector configured to reflect, toward the projection lens, emitted light from the second light emitting element, and
the second reflector is arranged at a position between the first light emitting element and the second light emitting element.

Advantageous Effects of Invention

The vehicular lamp according to the present invention is configured to radiate, toward the front of the lamp via the projection lens, light from the light source, the light being reflected by the reflector. Further, the reflective surface of the reflector includes the reflective region for illuminating the short-distance road surface within 5 m in front of the lamp, and the light diffusing treatment for diffusing and reflecting emitted light from the light source is applied to the reflective region. Therefore, it is possible to illuminate the short-distance road surface in front of the lamp by using reflective light from the reflective region at substantially uniform brightness having small light distribution unevenness.

As described above, according to the present invention, the vehicular lamp that includes the projection lens can illuminate the short-distance road surface in front of the lamp at substantially uniform brightness.

In addition, the vehicular lamp according to the present invention is configured to radiate, toward the front of the lamp via the projection lens, light from the light source. Specifically, the projection lens includes the tubular portion extending toward the rear of the lamp and is supported by the light source support member at the rear end of the tubular portion, and the light shielding treatment is applied to at least the upper region of the tubular portion. Therefore, the following operations and effects can be obtained.

That is, since the projection lens is supported by the light source support member at the rear end of the tubular portion, a member for supporting the projection lens, such as the bracket unit in the related art, is not necessary, and thus the number of parts can be reduced.

In addition, since the light shielding treatment is applied to at least the upper region of the tubular portion of the projection lens, in a case where the lamp is observed from obliquely above (that is, from a general observation direction), an internal space of the tubular portion can be prevented from being seen. Therefore, the appearance of the lamp can be ensured without requiring the arrangement of the cover member such as the extension in the related art.

As described above, according to the present invention, the vehicular lamp that includes the projection lens can ensure the appearance of the lamp by having an inexpensive and compact configuration.

Further, in the vehicular lamp according to the present invention, the reflector and the projection lens are supported by the common heat sink, and the light emitting element as the light source is also supported by the heat sink via the substrate. Therefore, it is possible to provide a lamp configuration capable of sufficiently ensuring a positional relation accuracy between the light emitting element mounted on the substrate, and the reflector and the projection lens.

Further, since the light emitting surface of the light emitting element is arranged to be inclined obliquely upward or obliquely downward toward the front of the lamp, it is possible to efficiently make not only reflective light from the reflector but also direct light from the light emitting element incident on the projection lens, and thus it is possible to improve lamp efficiency.

Along with this, the substrate on which the light emitting element is mounted is arranged in an inclined state, and the substrate is supported by the heat sink in a state of being pressed against the heat sink from the front side of the lamp by the reflector. Therefore, the light emitting element and the reflector can be arranged with high positional accuracy with respect to the heat sink, and thus the light distribution performance of the lamp can be sufficiently ensured.

As described above, according to the present invention, the vehicular lamp that includes the projection lens is capable of improving the lamp efficiency and then sufficiently ensuring the light distribution performance of the lamp.

In addition, the vehicular lamp according to the present invention is configured to radiate, toward the front of the lamp via the projection lens, light from the first and second light emitting elements, the light being reflected by the first and second reflectors. Specifically, the common substrate on which the first and second light emitting elements are mounted is arranged in a state where the light emitting surface of each of the first and second light emitting elements is inclined obliquely upward or obliquely downward toward the front of the lamp, and the second reflector is arranged to be positioned between the first light emitting element and the second light emitting element arranged at the position away from the first light emitting element to the front side of the lamp. Therefore, the following operations and effects can be obtained.

That is, the light emitting surface of each of the first and second light emitting elements is inclined obliquely upward or obliquely downward toward the front of the lamp. Therefore, the reflective light from the first and second reflectors, and the direct light from the first and second light emitting elements can be made incident on the projection lens with good balance, and thus the lamp efficiency can be improved.

In addition, the second reflector is arranged between the first and second light emitting elements. Therefore, a space for the arrangement of the second reflector can be minimized, and then the light from the second light emitting element can be efficiently reflected toward the projection lens by the second reflector at a position close to a direction perpendicular to the light emitting surface of the second light emitting element, and in this regard, the lamp efficiency can also be improved.

As described above, according to the present invention, the lamp efficiency can be improved in a case where the vehicular lamp that includes the projection lens has a configuration in which light from the first and second light emitting elements, which is reflected by the first and second reflectors, is made incident on the projection lens.

BRIEF DESCRIPTION OF DRAWINGS

FIG. 13, which is similar to FIG. 4, is a diagram that illustrates a first modification of the above embodiment.

FIG. 14, which is similar to FIG. 2, is a diagram that illustrates a second modification of the above embodiment.

FIG. 15, which is similar to FIG. 2, is a diagram that illustrates a third modification of the above embodiment.

FIG. 19, which is similar to FIG. 6, is a diagram that illustrates a seventh modification of the above embodiment.

DESCRIPTION OF EMBODIMENTS

Hereinafter, an embodiment of the present invention will be described with reference to the drawings.

Figure 1:
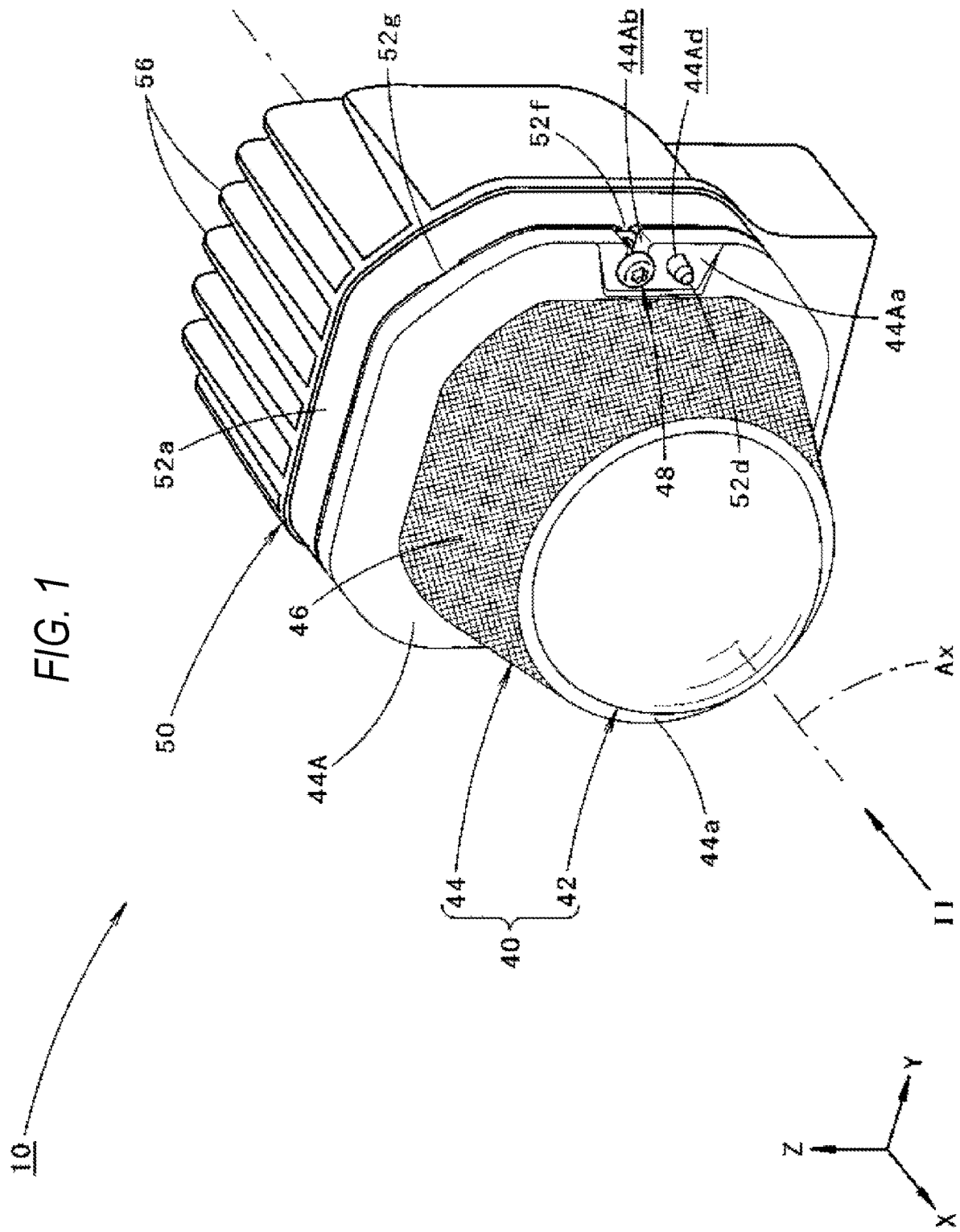
FIG. 1 is a perspective view illustrating a vehicular lamp according to an embodiment of the present invention.
Figure 2:
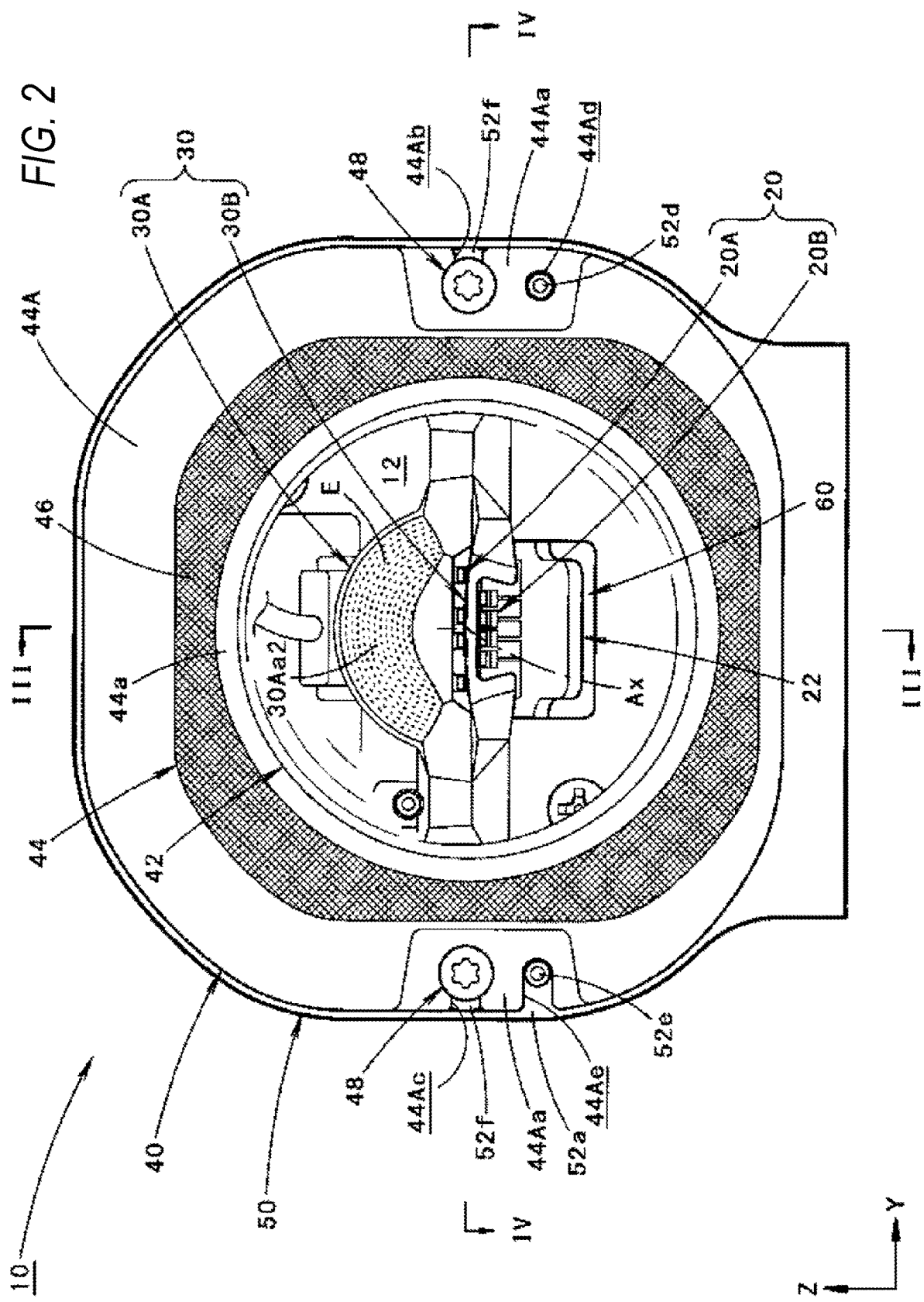
FIG. 2 is a view taken along an arrow II in FIG. 1.
Figure 3:
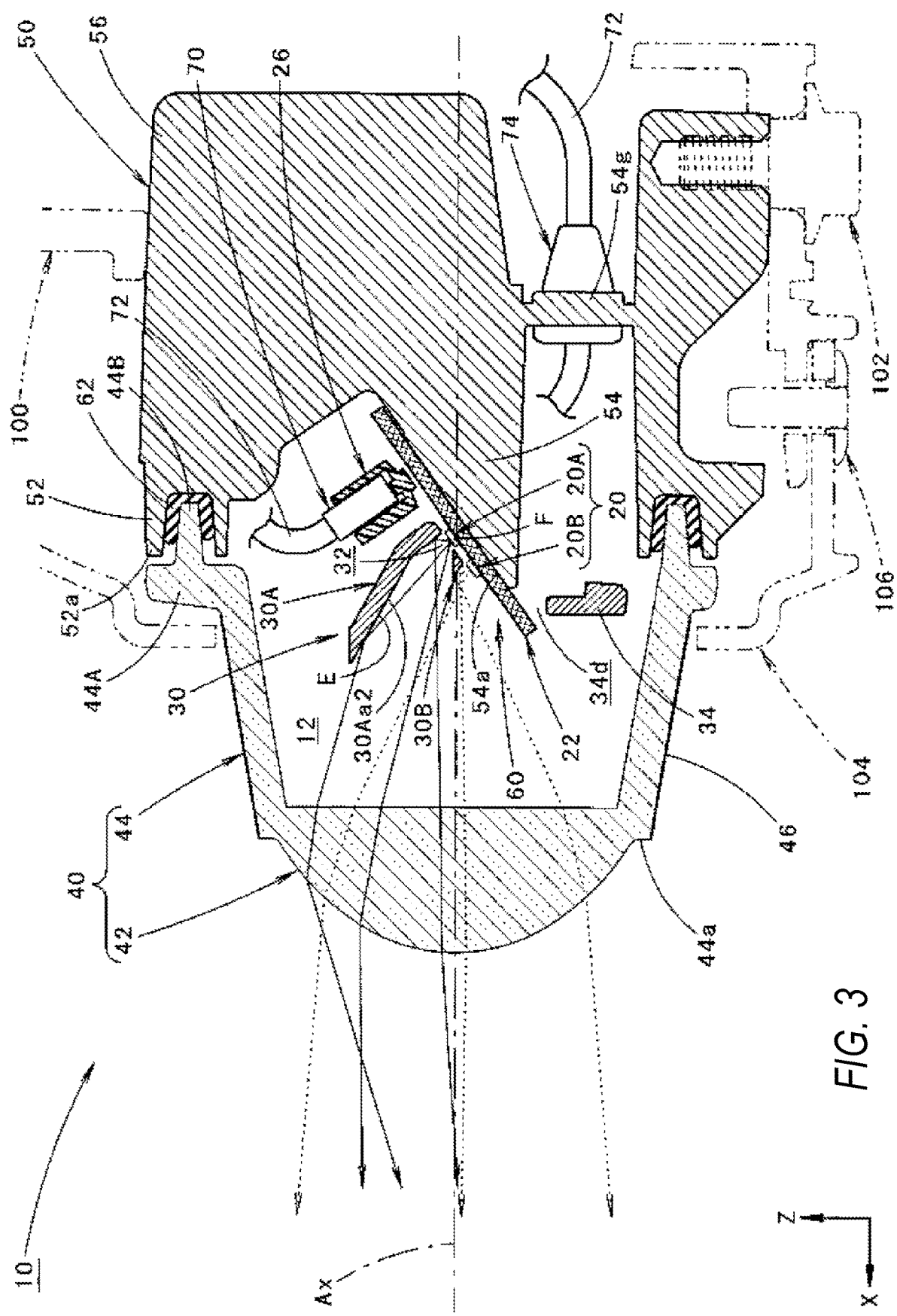
FIG. 3 is a cross-sectional view taken along a line in FIG. 2.
Figure 4:
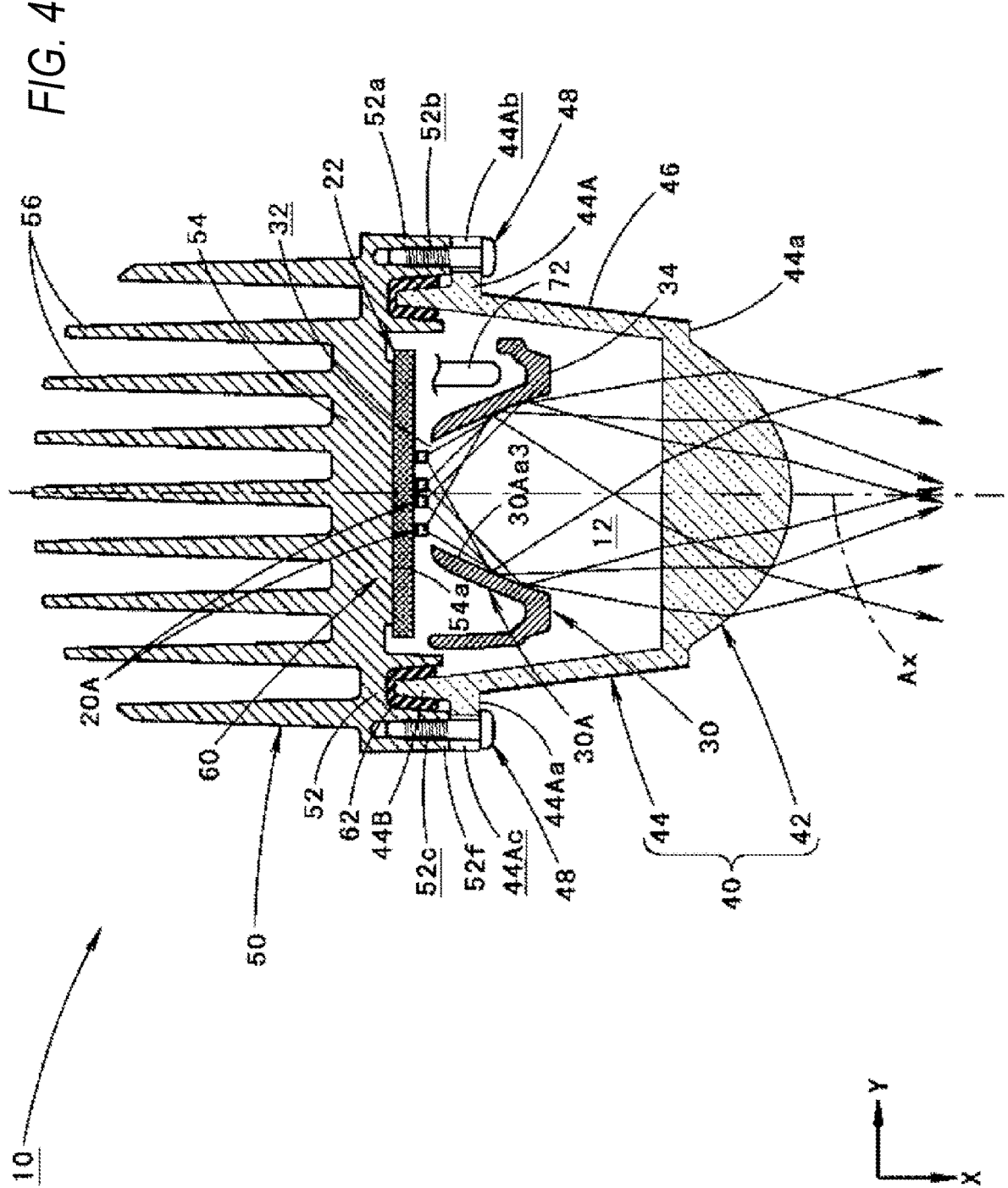
FIG. 4 is a cross-sectional view taken along a line IV-IV in FIG. 2.

FIG. 1 is a perspective view illustrating a vehicular lamp 10 according to an embodiment of the present invention. Further, FIG. 2 is a view taken along an arrow II in FIG. 1, FIG. 3 is a cross-sectional view taken along a line in FIG. 2, and FIG. 4 is a cross-sectional view taken along a line IV-IV in FIG. 2.

In FIGS. 1 to 4, a direction indicated by X is "the front of the lamp", a direction indicated by Y is a "left direction" (a "right direction" in a front view of the lamp) orthogonal to "the front of the lamp", and a direction indicated by Z is an "upward direction". The same applies to figures other than FIGS. 1 to 4.

The vehicular lamp 10 is a headlight for a two-wheel vehicle that is used in a state of being attached to a front end of the two-wheel vehicle, and is configured to selectively perform low-beam irradiation and high-beam irradiation.

First, an outline of the configuration of the vehicular lamp 10 will be described.

As illustrated in FIG. 3, the vehicular lamp 10 is a projector type lamp that includes a light source 20, a reflector 30, and a projection lens 40, and is configured to radiate, toward the front of the lamp (that is, the front of the vehicle) via the projection lens 40, light from the light source 20, which is reflected by the reflector 30.

As illustrated in FIG. 2, the light source 20 includes four first light emitting elements 20A configured to be lighted during the low-beam irradiation, and four second light emitting elements 20B configured to be additionally lighted during the high-beam irradiation.

The four first light emitting elements 20A and the four second light emitting elements 20B are mounted on a common substrate 22, and thus a substrate assembly 60 is formed.

The substrate assembly 60 is supported, by a heat sink 50, on the substrate 22. Further, the reflector 30 and the projection lens 40 are also supported by the heat sink 50.

The vehicular lamp 10 has a configuration in which the substrate assembly 60 and the reflector 30 are accommodated in a housing 12 formed by the projection lens 40 and the heat sink 50.

Figure 5:
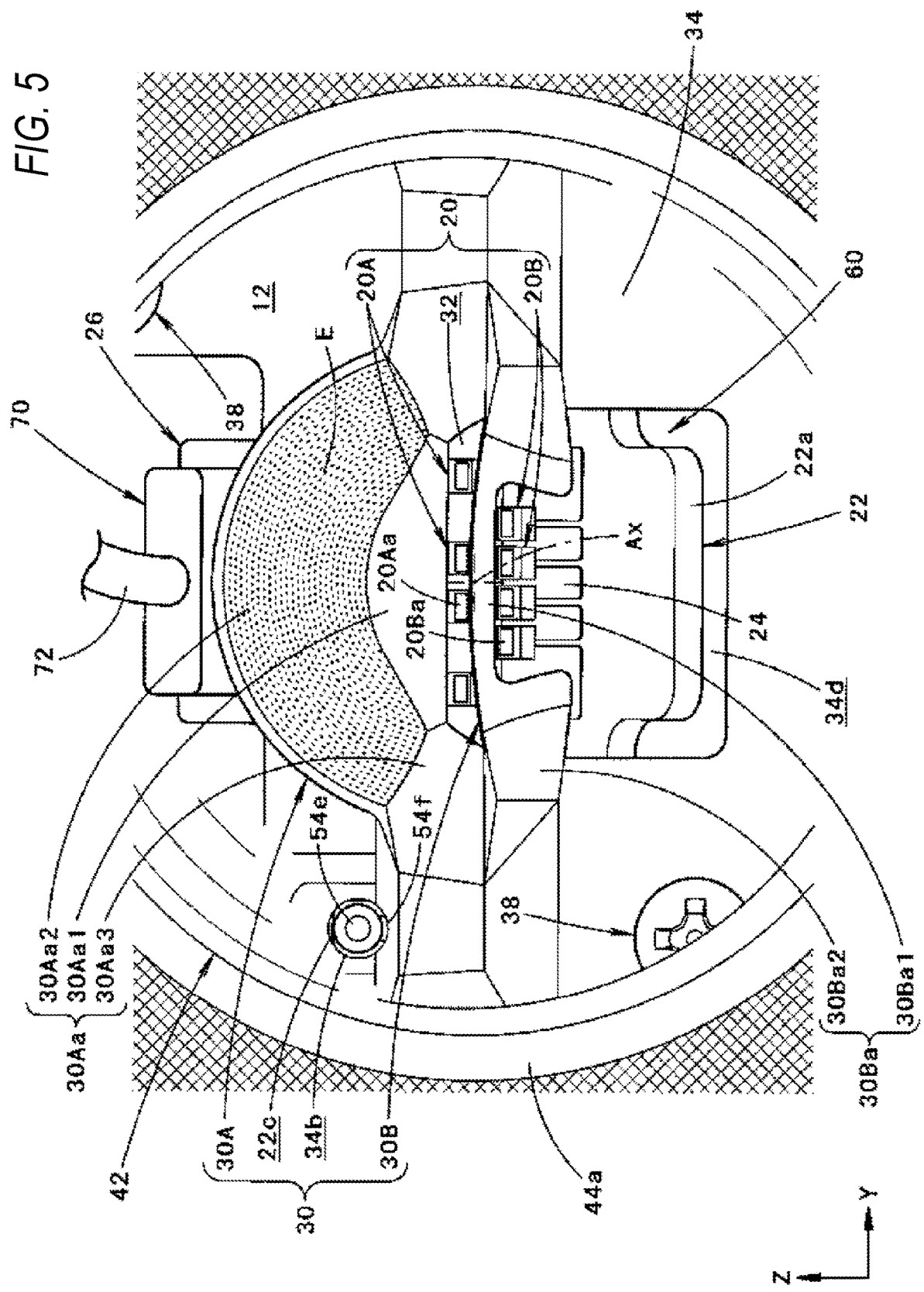
FIG. 5 is a detailed diagram of essential parts in FIG. 2.
Figure 6:
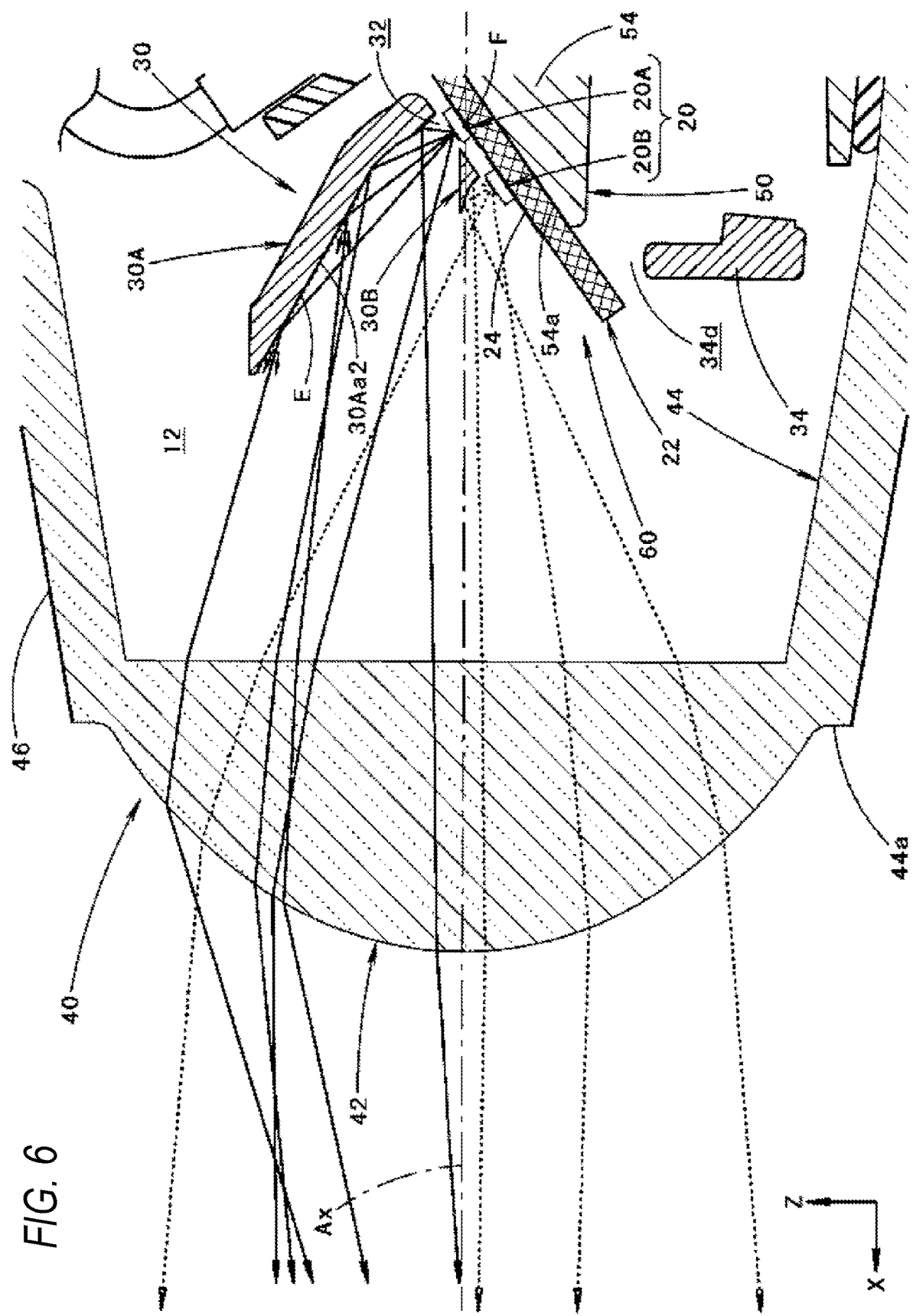
FIG. 6 is a detailed diagram of essential parts in FIG. 3.
Figure 7:
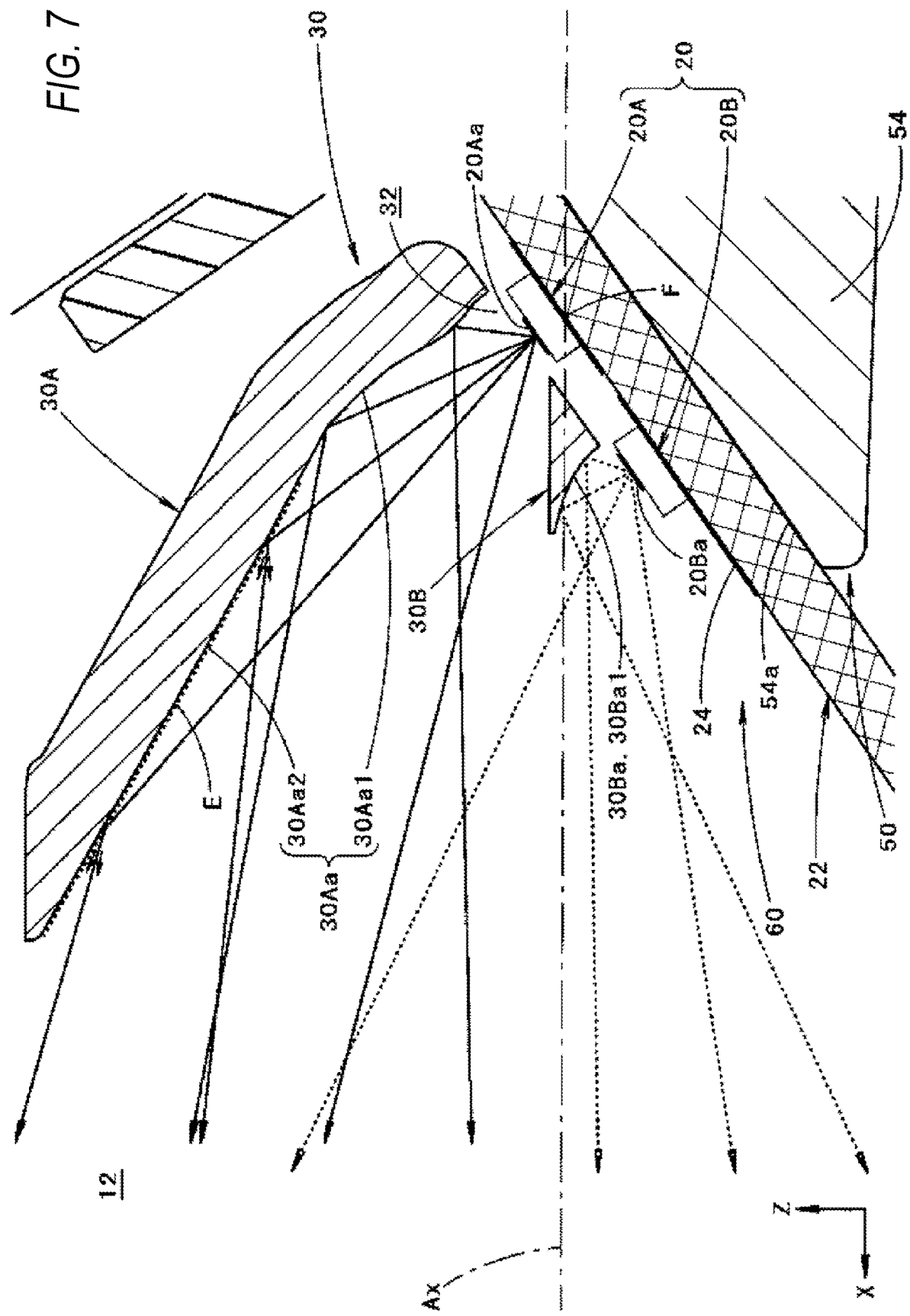
FIG. 7 is a detailed diagram of essential parts in FIG. 6.

FIG. 5 is a detailed diagram of essential parts in FIG. 2, FIG. 6 is a detailed diagram of essential parts in FIG. 3, and FIG. 7 is a detailed diagram of essential parts in FIG. 6.

As illustrated in FIGS. 5 to 7, the substrate 22 is arranged in a state where light emitting surfaces 20Aa of the four first light emitting elements 20A, and light emitting surfaces 20Ba of the four second light emitting elements 20B are inclined obliquely upward or obliquely downward toward the front of the lamp (that is, a state of being inclined in a rear-up manner with respect to a horizontal plane).

As illustrated in FIG. 5, the four first light emitting elements 20A are arranged side by side in the left-right direction. The four second light emitting elements 20B are arranged side by side in the left-right direction at positions away from the four first light emitting elements 20A to a front side of the lamp (specifically, positions away toward a front and obliquely downward side of the lamp along an upper surface of the substrate 22).

The reflector 30 has a configuration in which a first reflector 30A configured to reflect, toward the projection lens 40, emitted light from the four first light emitting elements 20A, and a second reflector 30B configured to reflect, toward the projection lens 40, emitted light from the four second light emitting elements 20B are integrally formed.

The first reflector 30A is arranged to cover the four first light emitting elements 20A from above. The second reflector 30B is arranged, below the first reflector 30A, to cover the four second light emitting elements 20B from above. In this case, the second reflector 30B is arranged to be positioned between the four first light emitting elements 20A and the four second light emitting elements 20B.

In order to achieve the above arrangement, an opening 32 extending in an elongate state in the left-right direction is formed, in the reflector 30, in a state of being positioned between the first reflector 30A and the second reflector 30B. A reflective surface 30Aa of the first reflector 30A is formed to have a larger size than a reflective surface 30Ba of the second reflector 30B. Further, the emitted light from the four first light emitting elements 20A is made incident on the first reflector 30A through the opening 32, and the emitted light from the four second light emitting elements 20B is made incident on the second reflector 30B under the opening 32.

In FIGS. 3, 4, 6, and 7, optical paths of the emitted light from the first light emitting elements 20A are indicated by solid lines, and optical paths of the emitted light from the second light emitting elements 20B are indicated by broken lines.

The projection lens 40 has an optical axis Ax extending in a front-rear direction of the lamp, and is configured to reversely project a projection image to be formed on a virtual vertical plane including a rear focus F of the projection lens 40 to form a low-beam light distribution pattern and a high-beam light distribution pattern (which will be described later). The rear focus F of the projection lens 40 is set to a position that is a center position of the four first light emitting elements 20A in the left-right direction and is a position slightly below the light emitting surfaces 20Aa (that is, a position above the light emitting surfaces 20Ba of the second light emitting elements 20B).

Next, the configuration of the vehicular lamp 10 will be described in detail.

Figure 8:
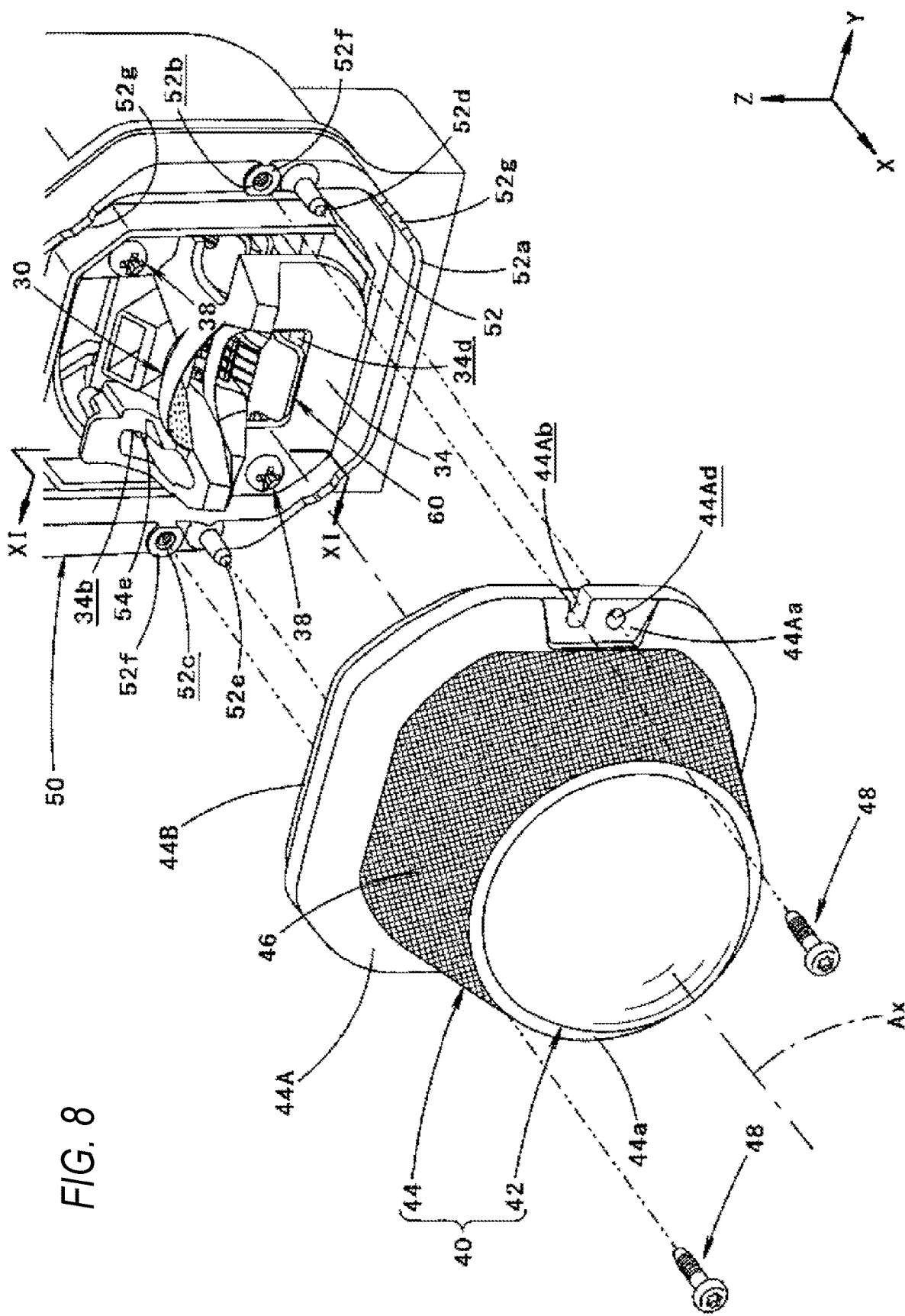
FIG. 8 is an exploded perspective view illustrating the vehicular lamp in FIG. 1 that is separated into a projection lens and a lamp component other than the projection lens.
Figure 9:
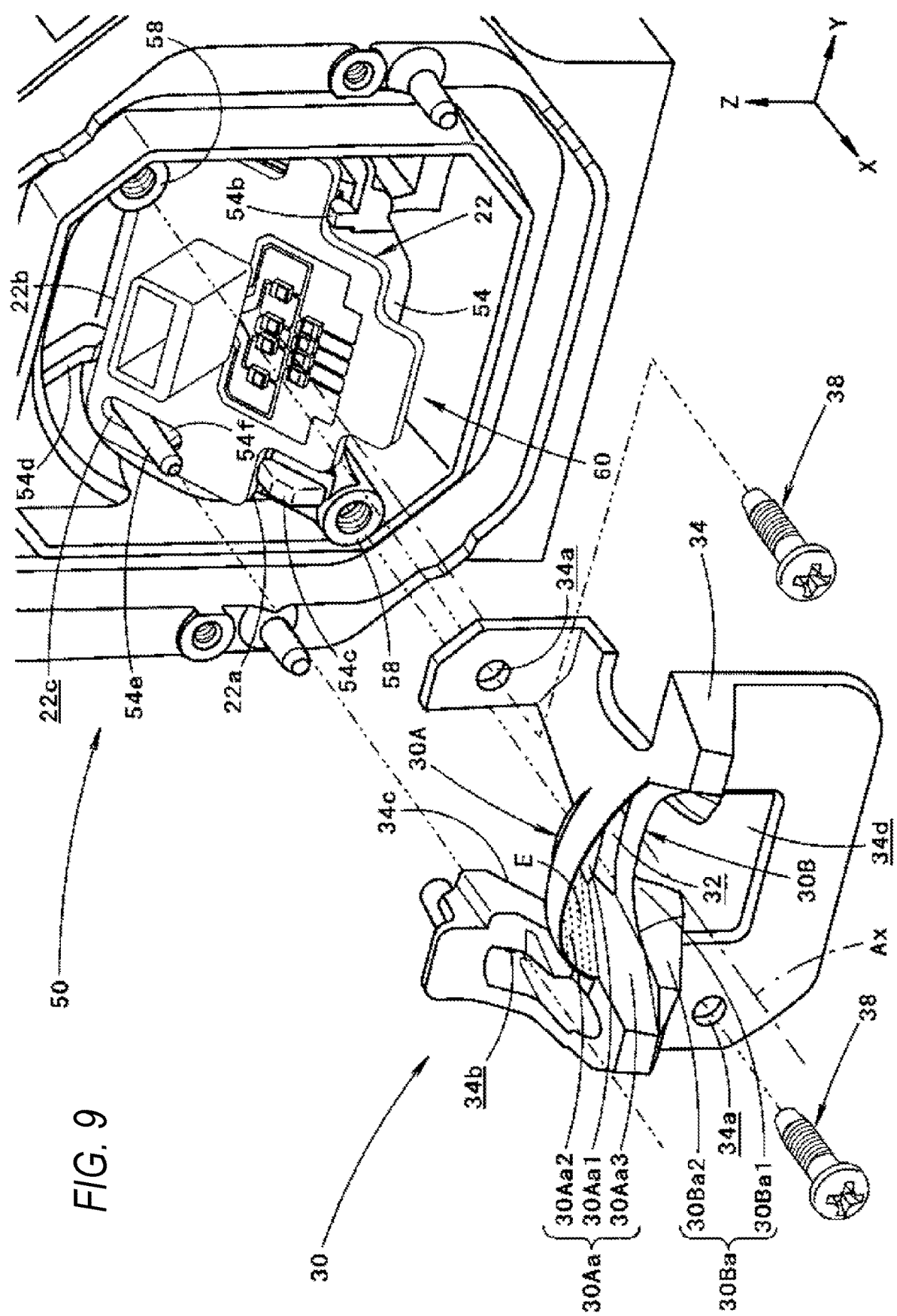
FIG. 9 is an exploded perspective view illustrating the lamp component in FIG. 8 in a state of being separated into a reflector, and a substrate assembly and a heat sink.
Figure 10:
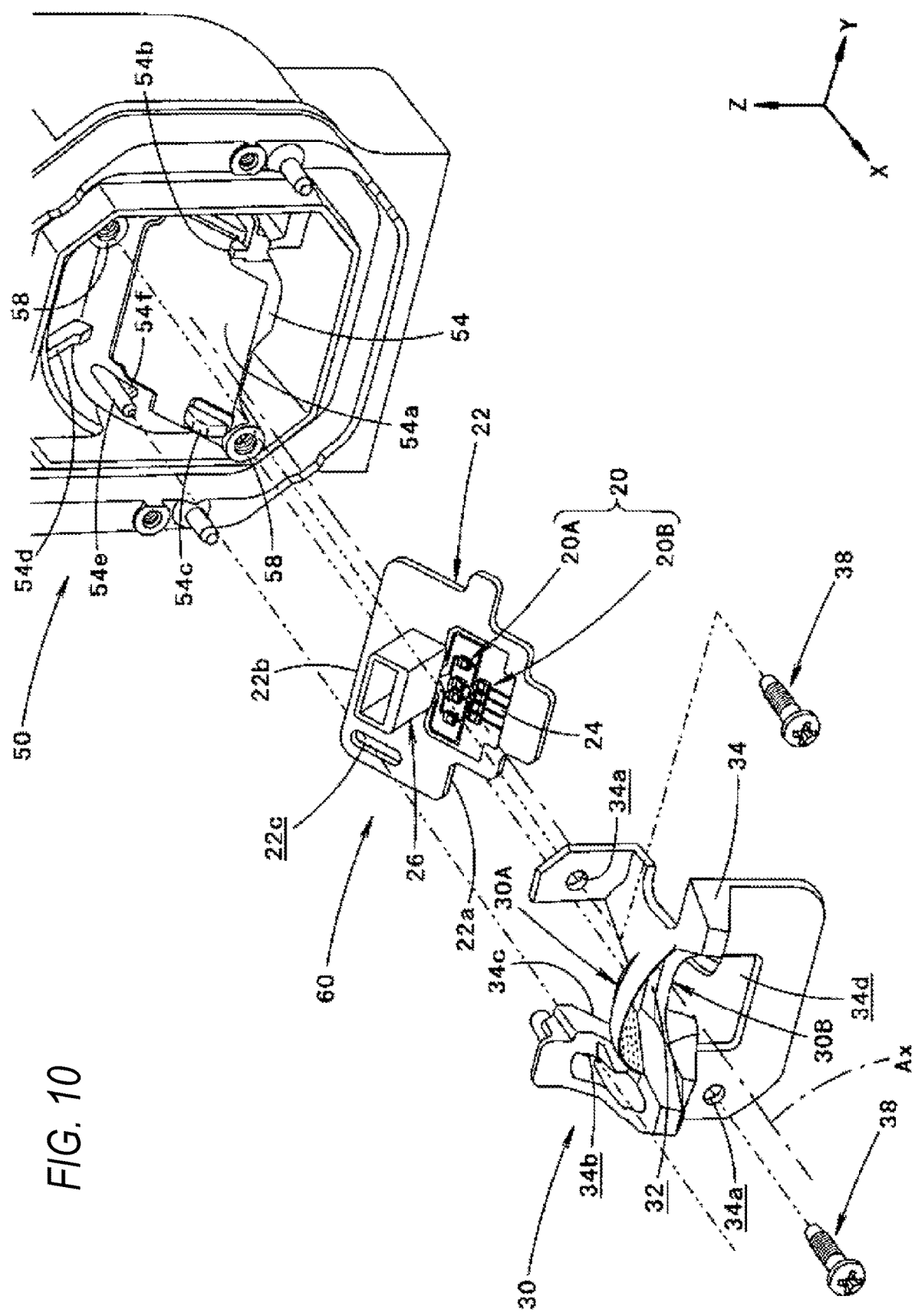
FIG. 10 is an exploded perspective view illustrating the lamp component in FIG. 8 in a state of being separated into the reflector, the substrate assembly, and the heat sink.

FIG. 8 is an exploded perspective view illustrating the vehicular lamp 10 that is separated into the projection lens 40 and a lamp component other than the projection lens 40. Further, FIG. 9 is an exploded perspective view illustrating the lamp component in FIG. 8 in a state of being separated into the reflector 30, and the substrate assembly 60 and the heat sink 50. FIG. 10 is an exploded perspective view illustrating the lamp component in FIG. 8 in a state of being separated into the reflector 30, the substrate assembly 60, and the heat sink 50.

First, a configuration of the projection lens 40 will be described.

As also illustrated in FIG. 8, the projection lens 40 is a colorless and transparent member (for example, an acrylic resin member). The projection lens 40 includes a lens body 42 performing an optical function as the projection lens 40, and a tubular portion 44 extending from an outer peripheral edge of the lens body 42 toward the rear of the lamp.

The lens body 42 is configured as a plano-convex aspherical lens having a front surface formed in a convex shape. The lens body 42 has a circular outer shape in the front view of the lamp.

A front end of the tubular portion 44 has a circular outer shape that is a size larger than that of the lens body 42. A front end surface 44a of the tubular portion 44 is formed in an annular shape. The tubular portion 44 is formed to gradually increase in diameter toward the rear of the lamp. A rear end of the tubular portion 44 has a substantially octagonal outer shape. The tubular portion 44 is formed to gradually increase in thickness from an upper end to a lower end of the tubular portion 44.

At the rear end of the tubular portion 44, an outer peripheral flange 44A is formed over the entire periphery of the rear end. The outer peripheral flange 44A has a substantially octagonal outer shape. The outer peripheral flange 44A is formed at a substantially constant width, and the width of the outer peripheral flange 44A in a lower region is narrow. Further, the outer peripheral flange 44A is formed to gradually decrease in thickness toward an outer peripheral side. A rear surface of the outer peripheral flange 44A extends along a vertical plane orthogonal to the optical axis Ax. An annular protrusion 44B extending toward the rear of the lamp is formed on the rear surface of the outer peripheral flange 44A.

Flat portions 44Aa are formed at two left and right positions of the outer peripheral flange 44A. Each flat portion 44Aa is formed by partially recessing a front surface of the outer peripheral flange 44A in a planar shape.

As illustrated in FIG. 2, in the pair of left and right flat portions 44Aa, respective U-shaped notch portions 44Ab, 44Ac each extending in a horizontal direction are formed at positions each having substantially the same height as the optical axis Ax. Further, a circular through hole 44Ad is formed below the notch portion 44Ab on the left side (the right side in the front view of the lamp). A U-shaped notch portion 44Ae extending in the horizontal direction is formed below the notch portion 44Ac on the right side.

A surface treatment using a hard coat is applied to the front surface of the lens body 42 of the projection lens 40. Further, a light shielding treatment is applied to an outer peripheral surface of the tubular portion 44 of the projection lens 40. In the light shielding treatment, a black coating film 46 is formed over the entire periphery of a range, of the tubular portion 44, from a connection position with the front end surface 44a to a connection position with the outer peripheral flange 44A.

Next, a configuration of the heat sink 50 will be described.

As illustrated in FIGS. 3 and 4, the heat sink 50 is configured as a metal member (for example, an aluminum die-cast molded product) that includes a plurality of heat dissipation fins 56 extending toward the rear of the lamp.

In the heat sink 50, a U groove-shaped annular recess 52 is formed at a position corresponding to the annular protrusion 44B of the projection lens 40. Further, in a case where the annular protrusion 44B of the projection lens 40 is inserted into the annular recess 52 from the front side of the lamp in a state where the annular recess 52 is filled with a sealant 62 such as an adhesive, the projection lens 40 is supported with respect to the heat sink 50 in a state where airtightness in the housing 12 can be maintained.

As illustrated in FIG. 8, the annular recess 52 is formed to have thick left and right portions of an outer peripheral wall 52a. On a front end surface of the outer peripheral wall 52a, a pair of left and right screw holes 52b, 52c are formed at positions having substantially the same height as the optical axis Ax. A pair of left and right positioning pins 52d, 52e are formed below the screw holes 52b, 52c. Further, on the front end surface of the outer peripheral wall 52a, annular protrusion surfaces 52f are formed in peripheral edge regions of the pair of left and right screw holes 52b, 52c. Protrusion surfaces 52g are respectively formed on four corner portions of the front end surface of the outer peripheral wall 52a.

The projection lens 40 is screwed and fixed to the heat sink 50 at the two left and right positions.

Specifically, in a state where the rear surface of the outer peripheral flange 44A is pressed against the plurality of protrusion surfaces 52f, 52g formed on the outer peripheral wall 52a of the heat sink 50, screws 48 inserted, via the pair of left and right notch portions 44Ab, 44Ac, into the pair of left and right screw holes 52b, 52c of the heat sink 50 are fastened. Therefore, the projection lens 40 is fixed to the heat sink 50.

At this time, the pair of left and right positioning pins 52d, 52e formed in the heat sink 50 are inserted into the through hole 44Ad and the notch portion 44Ae formed in the outer peripheral flange 44A of the projection lens 40. Accordingly, the projection lens 40 and the heat sink 50 are positioned in a direction along the vertical plane orthogonal to the optical axis Ax.

Next, a configuration of the substrate assembly 60 will be described.

As illustrated in FIG. 5, the four second light emitting elements 20B are mutually arranged, at a slight interval, around a vertical plane including the optical axis Ax of the projection lens 40. On the other hand, the four first light emitting elements 20A are also arranged around the vertical plane including the optical axis Ax. Among the four first light emitting elements 20A, the two first light emitting elements 20A positioned at a central portion are arranged at an interval larger than the interval between the second light emitting elements 20B in some degree. In addition, among the four first light emitting elements 20A, the two first light emitting elements 20A positioned at both ends are arranged at an interval, with respect to the first light emitting elements 20A adjacent to the inside, further larger than the interval between the two first light emitting elements 20A positioned at the central portion.

The first and second light emitting elements 20A, 20B have the same configuration, and the light emitting surfaces 20Aa, 20Ba of the first and second light emitting elements 20A, 20B are formed in a horizontally long rectangular shape. The light emitting surfaces 20Aa and the light emitting surfaces 20Bb are arranged in opposite directions in the longitudinal direction. That is, each of the first light emitting elements 20A is arranged such that the light emitting surface 20Aa is positioned near a front edge, and each of the second light emitting elements 20B is arranged such that the light emitting surface 20Ba is positioned near a rear edge.

The substrate 22 has a configuration in which conductive layers 24 are formed, by a predetermined wiring pattern, on an upper surface of a metal plate (for example, an aluminum plate) via an insulating layer (not shown). Each of the first and second light emitting elements 20A, 20B is electrically connected to a connector 26 mounted on the upper surface of the substrate 22 at the rear side of the lamp, in a state where each of the first and second light emitting elements 20A, 20B is arranged to straddle two of the conductive layers 24. Then, a power source side connector 70 is attached to the connector 26 to supply power to each of the first and second light emitting elements 20A, 20B.

Next, a configuration of the reflector 30 will be described.

As illustrated in FIGS. 5 and 9, the reflector 30 is a metal member (for example, an aluminum die-cast molded product), and the reflector 30 includes the first and second reflectors 30A, 30B and a peripheral structure portion 34 formed to connect the first and second reflectors 30A, 30B.

The first reflector 30A includes four reflective regions, as the reflective surface 30Aa. That is, the reflective surface 30Aa includes two reflective regions 30Aa1, 30Aa2 positioned above the opening 32, and a pair of reflective regions 30Aa3 positioned on both left and right sides of the opening 32.

The reflective region 30Aa1 is formed to face the opening 32 at a lower edge of the reflective region 30Aa1. The reflective region 30Aa2 is formed to surround the reflective region 30Aa1 from above. The reflective region 30Aa2 has a substantially sector outer shape in the front view of the lamp. The pair of left and right reflective regions 30Aa3 are formed to face the opening 32 at inner edges of the pair of left and right reflective regions 30Aa3.

A light diffusing treatment for diffusing and reflecting the emitted light from the four first light emitting elements 20A is applied to the reflective region 30Aa2. The light diffusing treatment is performed by applying a emboss processing E to a reflective region 30Aa2.

The second reflector 30B includes three reflective regions, as the reflective surface 30Ba. That is, the reflective surface 30Ba includes a reflective region 30Ba1 positioned below the opening 32, and a pair of reflective regions 30Ba2 positioned on both left and right sides of the reflective region 30Ba1. The reflective region 30Ba1 is formed, on both left and right sides of the four second light emitting elements 20B, to extend round to a position below the four second light emitting elements 20B. The pair of left and right reflective regions 30Ba2 are formed adjacent to a pair of left and right wraparound portions of the reflective region 30Ba1.

An upper end surface of the second reflector 30B is formed as a convex curved surface that is curved slightly upward with respect to the horizontal plane. Specifically, the upper end surface of the second reflector 30B is formed to linearly extend slightly downward toward the front of the lamp and to hang down on both left and right sides around the vertical plane including the optical axis Ax, and a rear edge of the second reflector 30B defines a shape of a lower edge of the opening 32.

Next, a support structure, for the substrate assembly 60 and the reflector 30, using the heat sink 50 will be described.

As illustrated in FIG. 3, the heat sink 50 includes a substrate support portion 54 for supporting the substrate 22 of the substrate assembly 60.

The substrate support portion 54 includes a substrate support surface 54a formed in an inclined surface shape to support the substrate 22 in the state of being inclined upward toward rear end. An upward inclination angle of the substrate support surface 54a with respect to the horizontal plane is set to a value of about 20 to 50 degrees, more preferably, about 25 to degrees, for example, about 35 degrees.

As illustrated in FIGS. 9 and 10, the substrate 22 is supported by the heat sink 50 in a state of being pressed against the substrate support surface 54a from the front side of the lamp by the peripheral structure portion 34 of the reflector 30. At this time, the substrate support surface 54a includes a flat surface slightly protruding from a peripheral region of the substrate support surface 54a, and thus the substrate 22 is more reliably in surface contact with the substrate support surface 54a.

As illustrated in FIG. 8, the reflector 30 is screwed and fixed to the heat sink 50 at two positions of the peripheral structure portion 34.

Specifically, as illustrated in FIG. 9, boss portions 58 are formed at a lower right corner portion and an upper left corner portion of the heat sink 50. Further, screw insertion holes 34a are formed in a lower right portion and an upper left portion of the peripheral structure portion 34 of the reflector 30. The reflector 30 is fixed to the heat sink 50 by inserting screws 38 into screw holes of the boss portions 58 through the screw insertion holes 34a, in a state where the peripheral structure portion 34 is pressed against the substrate 22 and top surfaces of the boss portions 58 at the two positions.

As illustrated in FIG. 10, in the substrate support portion 54 of the heat sink 50, a pair of positioning protrusions 54b, 54c are formed on both left and right sides of the substrate support surface 54a. Further, a pair of left and right positioning beam portions 54d (only the right positioning beam portion is shown) extending in the vertical direction are formed, on the rear side of the lamp in the substrate support portion 54, at positions corresponding to the pair of left and right positioning protrusions 54b, 54c.

In a case where the substrate 22 is placed on the substrate support surface 54a, the pair of left and right positioning protrusions 54b, 54c and the pair of left and right positioning beam portions 54d are engaged with a front end surface 22a and a rear end surface 22b of the substrate 22 to perform a guide function, and a position of the substrate 22 in a vehicle direction in a case where the substrate 22 is placed on the substrate support surface 54a can be substantially determined.

Further, a positioning pin 54e for determining positions of the substrate assembly 60 and the reflector 30 with respect to the heat sink 50 is formed in the substrate support portion 54 of the heat sink 50.

Figure 11:
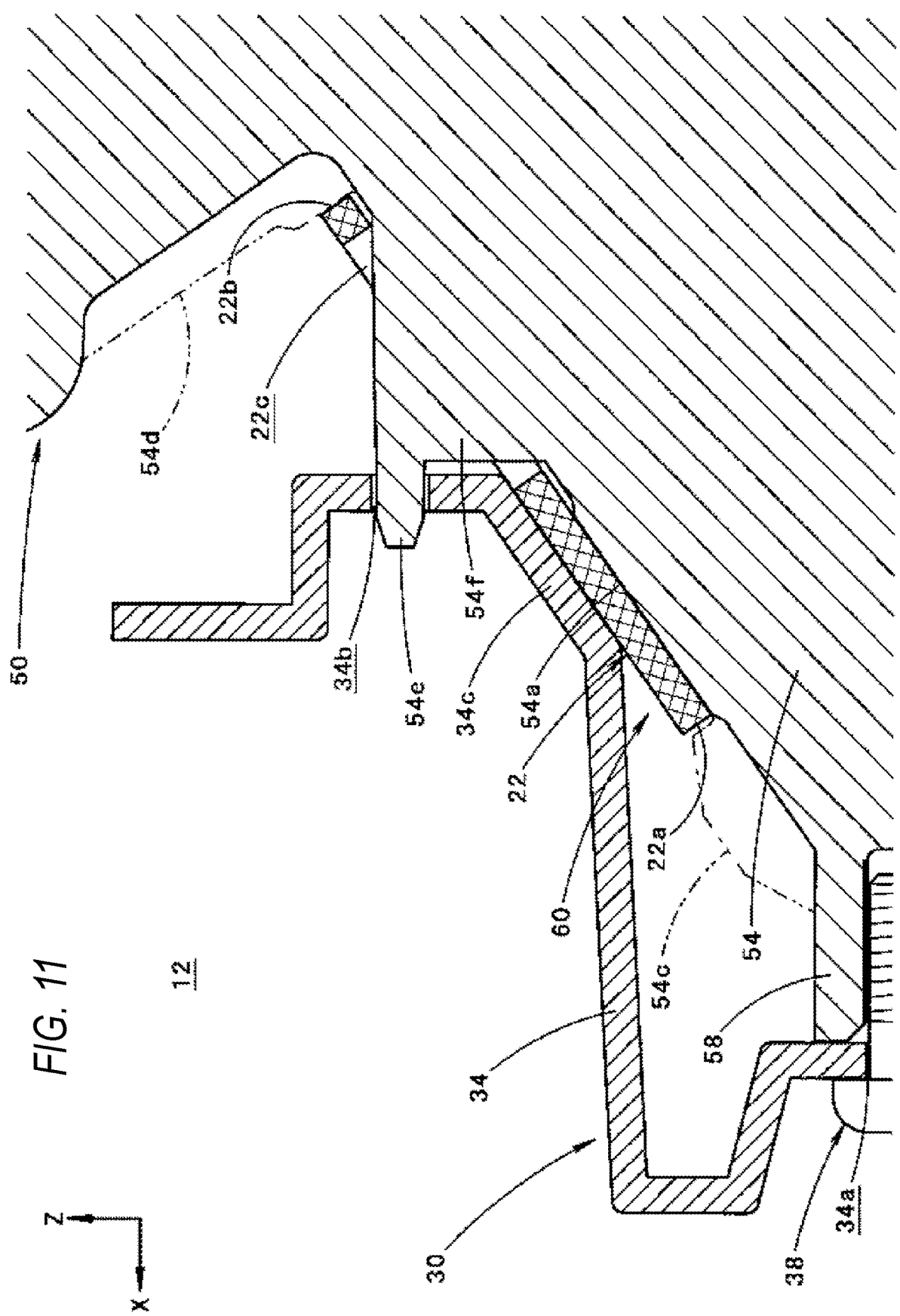
FIG. 11 is a cross-sectional view taken along a line XI-XI in FIG. 8.

FIG. 11 is a cross-sectional view taken along a line XI-XI in FIG. 8.

As illustrated in FIGS. 10 and 11, the positioning pin 54e is formed to extend, toward the front of the lamp, on the further right side than the positioning protrusion 54c and the positioning beam portion 54d on the right side.

A vertical rib 54f is formed at a lower end of the positioning pin 54e. The vertical rib 54f extends, along the positioning pin 54e, toward the front of the lamp. A front edge of the vertical rib 54f is positioned at the rear side of the lamp with respect to a top surface of the positioning pin 54e.

An insertion hole 22c through which the positioning pin 54e and the vertical rib 54f are inserted is formed in the substrate 22. The insertion hole 22c has a long hole extending, in the longitudinal direction of the lamp, along the inclined substrate 22. A left-right width of the insertion hole 22c is set to a value slightly larger than an outer diameter of the positioning pin 54e.

In the peripheral structure portion 34 of the reflector 30, a pin insertion hole 34b serving as an engagement portion that is engaged with the positioning pin 54e is formed. The pin insertion hole 34b has a circular hole having a diameter slightly larger than that of the positioning pin 54e.

Further, a substrate abutting portion 34c configured to abut, from the front side of the lamp, against the substrate 22 placed on the substrate support surface 54a is formed in the peripheral structure portion 34 of the reflector 30. The substrate abutting portion 34c is formed to be positioned below the pin insertion hole 34b.

In this way, in a state where the positioning pin 54e of the heat sink 50 is inserted, from the rear side of the lamp, into the insertion hole 22c of the substrate 22 and the pin insertion hole 34b of the reflector 30, the substrate abutting portion 34c of the reflector 30 abuts, from the front side of the lamp, against the substrate 22 placed on the substrate support surface 54a of the heat sink 50. Accordingly, the substrate assembly 60 and the reflector 30 are positioned, with respect to the heat sink 50, in the longitudinal direction of the lamp and in a direction along the vertical plane orthogonal to the longitudinal direction.

At this time, since the substrate abutting portion 34c of the reflector 30 abuts against the substrate 22 from the front side of the lamp, the substrate 22 is displaced toward the rear side of the lamp along the substrate support surface 54a in a state where the substrate 22 is in surface contact with the substrate support surface 54a of the heat sink 50, and the rear end surface 22b of the substrate 22 abuts against the positioning beam portions 54d of the heat sink 50. Accordingly, the positioning accuracy, in the longitudinal direction, of the substrate assembly 60 of the lamp is sufficiently ensured. Further, at this time, a rear end wall of the insertion hole 22c of the substrate 22 is in a state of being engaged with the positioning pin 54e, and thus the positioning, in the longitudinal direction, of the lamp is further reliably performed.

As illustrated in FIG. 10, the front end surface 22a of the substrate 22 is formed to be displaced stepwise on the front side of the lamp toward a center position in the left-right direction. On the other hand, an opening 34d for protruding, toward the front side of the lamp, a center of the front end surface 22a of the substrate 22 in the left-right direction is formed in the peripheral structure portion 34 of the reflector 30.

As illustrated in FIG. 3, a cord 72 extending to a power source (not shown) on a vehicle body side is connected to the power source side connector 70. A bushing 74 is attached to a middle portion of the cord 72.

In a lower end of the substrate support portion 54 of the heat sink 50, a cord insertion portion 54g through which the cord 72 is inserted and for drawing the cord 72 to an external space of the housing 12 is formed. A through hole (not shown) is formed in the cord insertion portion 54g. Further, in a case where the bushing 74 attached to the cord 72 is pressed into the through hole from the front side of the lamp, the airtightness in the housing 12 is maintained.

As indicated by a two-dot chain line in FIG. 3, the vehicular lamp 10 can be attached to a vehicle body side bracket 100 via an attaching tool 102 such as a bolt in the heat sink 50. Further, the vehicular lamp 10 has a configuration in which a cover member 104 for covering, from the front side of the lamp, the outer peripheral flange 44A of the tubular portion 44 of the projection lens 40 can be attached to the vehicle body side bracket 100 via an attaching tool 106.

Next, a specific light distribution control function of the vehicular lamp 10 will be described.

Figure 12A:
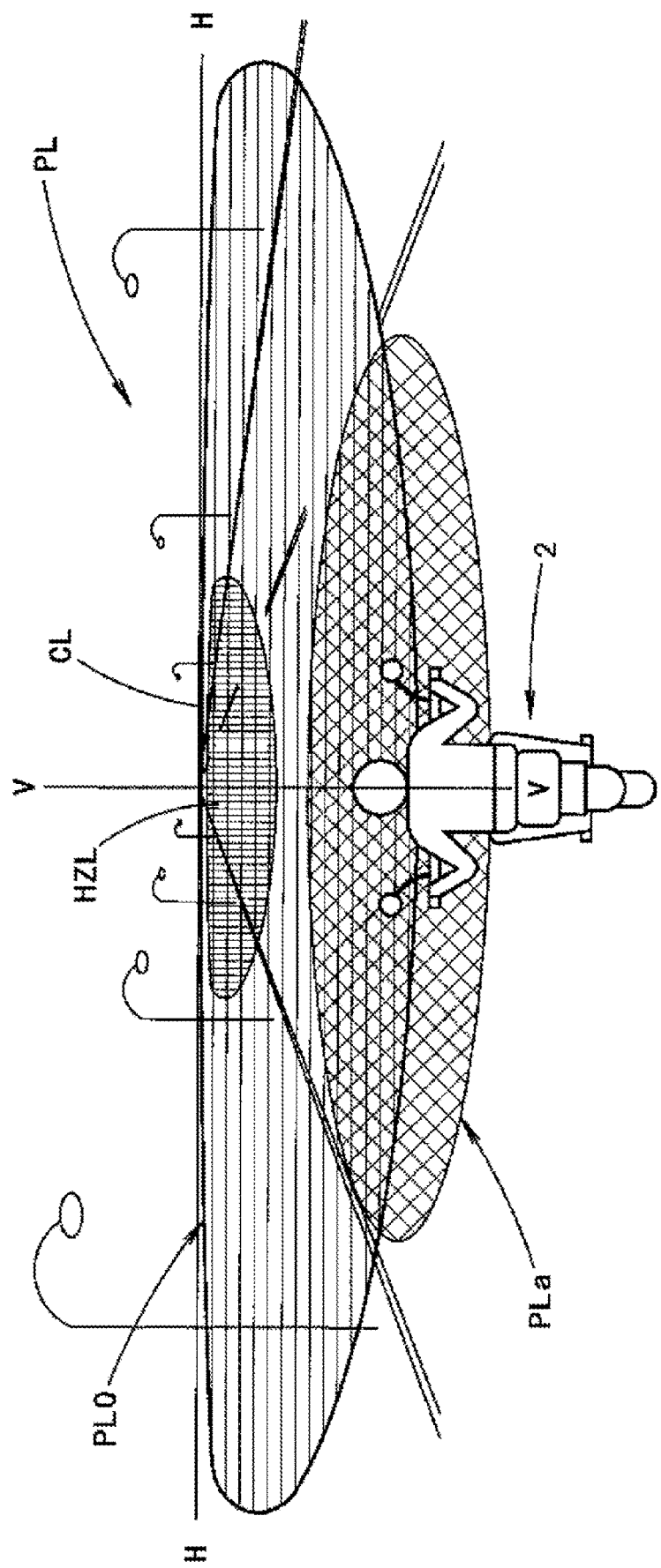
FIG. 12A is a diagram illustrating a light distribution pattern formed by radiated light from the vehicular lamp in FIG. 1 in a see-through manner.
Figure 12B:
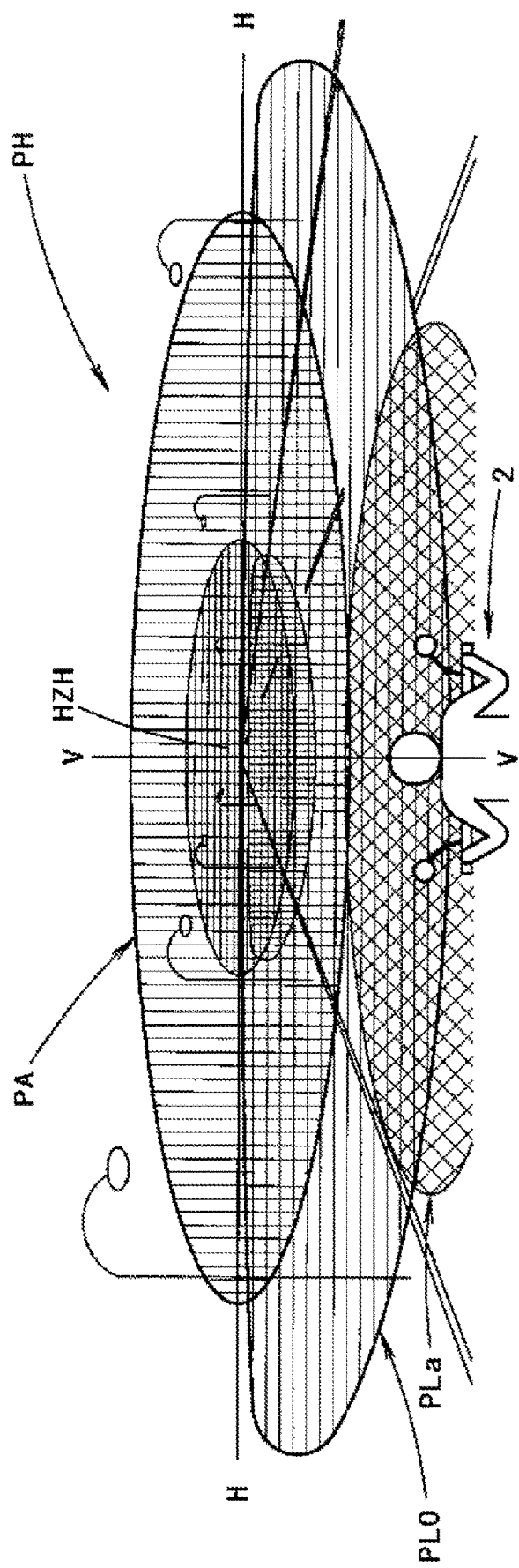
FIG. 12B is a diagram illustrating a light distribution pattern formed by radiated light from the vehicular lamp in FIG. 1 in a see-through manner.

FIGS. 12A and 12B are diagrams each illustrating, in a see-through manner, a two-wheel vehicle 2 and a light distribution pattern formed on a virtual vertical screen arranged at a position 25 m in front of the lamp by light emitted from the vehicular lamp 10 toward the front of the lamp (that is, the front of the vehicle). FIG. 12A illustrates a low-beam light distribution pattern PL, and FIG. 12B illustrates a high-beam light distribution pattern PH.

The low-beam light distribution pattern PL illustrated in FIG. 12A is a light distribution pattern formed in a case where the four first light emitting elements 20A are lighted. The low-beam light distribution pattern PL is formed by radiating light from the four first light emitting elements 20A, which is reflected by the first reflector 30A, toward the front of the lamp via the projection lens 40.

The low-beam light distribution pattern PL is formed as a light distribution pattern obtained by combining a basic light distribution pattern PLO and a short-distance light distribution pattern PLa.

The basic light distribution pattern PLO is a light distribution pattern formed by reflective light from the reflective region 30Aa1 and the pair of left and reflective regions 30Aa3 in the reflective surface 30Aa of the first reflector 30A. The basic light distribution pattern PLO is formed as a horizontally long light distribution pattern that spreads largely on both left and right sides around a V-V line that is a vertical line passing through an H-V on a side lower than an H-H line that is a horizontal line passing through the H-V.

The reason why the basic light distribution pattern PLO is formed as the horizontally long light distribution pattern in this way is that the four first light emitting elements 20A are mutually arranged at intervals, and the first reflector 30A includes the pair of left and right reflective regions 30Aa3.

An upper edge of the basic light distribution pattern PLO is formed as a cutoff line CL extending substantially in the horizontal direction near a lower side of the H-H line, and a high luminous intensity region HZL with the V-V line as a center is formed along the cutoff line CL.

The short-distance light distribution pattern PLa is a light distribution pattern formed by reflective light from the reflective region 30Aa2 in the reflective surface 30Aa of the first reflector 30A. The short-distance light distribution pattern PLa is formed as a horizontally long light distribution pattern that illuminates a short-distance road surface within 5 m in front of the lamp in a state of being positioned on a front side of the basic light distribution pattern PLO. At this time, since the light diffusing treatment using the emboss processing is applied to the reflective region 30Aa2, the short-distance light distribution pattern PLa is formed as a light distribution pattern having substantially uniform brightness. Further, the reason why the short-distance light distribution pattern PLa is formed as a relatively horizontally long light distribution pattern is mainly that the four first light emitting elements 20A are mutually arranged at intervals.

As illustrated in FIG. 12B, the high-beam light distribution pattern PH is a light distribution pattern formed in a case where the four second light emitting elements 20B are additionally lighted in a state where the four first light emitting elements 20A are lighted. The high-beam light distribution pattern PH is obtained by adding, to the low-beam light distribution pattern PL, an additional light distribution pattern PA that straddles the cutoff line CL and spreads to an upper side.

The additional light distribution pattern PA is a light distribution pattern formed by radiating light from the four second light emitting elements 20B, which is reflected by the second reflector 30B, toward the front of the lamp via the projection lens 40. The additional light distribution pattern PA is formed as a horizontally long light distribution pattern that spreads largely on both left and right sides around the H-V and also spreads in the vertical direction in some degree. The additional light distribution pattern PA has a high luminous intensity region around the H-V.

The additional light distribution pattern PA is formed as a light distribution pattern that is relatively bright at left and right diffusion angles smaller than that of the basic light distribution pattern PLO of the low-beam light distribution pattern PL. This is mainly because the four second light emitting elements 20B are mutually closely arranged.

Then, the horizontally long high-beam light distribution pattern PH having a high luminous intensity region HZH around the H-V is formed by superimposing the low-beam light distribution pattern PL and the additional light distribution pattern PA in this manner.

Next, operations of the present embodiment will be described.

The vehicular lamp 10 according to the present embodiment is configured to radiate light, toward the front of the lamp via the projection lens 40, from the light source 20, which is reflected by the reflector 30. Further, the reflective surface of the reflector 30 includes the reflective region 30Aa2 for illuminating the short-distance road surface within 5 m in front of the lamp. The light diffusing treatment for diffusing and reflecting emitted light from the light source 20 is applied to the reflective region 30Aa2. Therefore, it is possible to illuminate, at substantially uniform brightness having small light distribution unevenness, the short-distance road surface in front of the lamp by using reflective light from the reflective region 30Aa2.

As described above, according to the present embodiment, the vehicular lamp 10 that includes the projection lens 40 can illuminate the short-distance road surface in front of the lamp with substantially uniform brightness.

In particular, in the present embodiment, since the light diffusing treatment applied to the reflective region 30Aa2 is performed by using the emboss processing E, it is possible to diffuse the reflective light from the reflective region 30Aa2 in all directions, and thus it is possible to sufficiently ensure a light diffusing function.

In the present embodiment, the first light emitting elements 20A mounted on the substrate 22 are provided as the light source 20, the substrate 22 is arranged in the state where the light emitting surfaces 20Aa of the first light emitting elements 20A are inclined obliquely upward toward the front of the lamp, and further, the first reflector 30A arranged to cover the first light emitting elements 20A from above is provided as the reflector 30. Therefore, the reflective region 30Aa2 for illuminating the short-distance road surface in front of the lamp can be easily ensured. Moreover, it is possible to efficiently make not only the reflective light from the first reflector 30A but also the direct light from the first light emitting elements 20A incident on the projection lens 40, and thus the lamp efficiency can be improved.

Further, in the present embodiment, the light source 20 includes the first light emitting elements 20A configured to be lighted during the low-beam irradiation, and the second light emitting elements 20B configured to be additionally lighted during the high-beam irradiation, and the second light emitting elements 20B are arranged at the positions away from the first light emitting elements 20A to the front side of the lamp. In addition, the reflector 30 includes the first reflector 30A configured to reflect, toward the projection lens 40, the emitted light from the first light emitting elements 20A, and the second reflector 30B configured to reflect, toward the projection lens 40, the emitted light from the second light emitting elements 20B, the second reflector 30B is arranged to be positioned between the first light emitting elements 20A and the second light emitting elements 20B, and further, the reflective region 30Aa2 is formed on the reflective surface 30Aa of the first reflector 30A. Therefore, the following operations and effects can be obtained.

That is, it is particularly necessary to sufficiently ensure visibility of the short-distance road surface in front of the lamp, during the low-beam irradiation. Further, in a case where the light distribution unevenness occurs on the short-distance road surface, the light distribution unevenness is very conspicuous. Therefore, it is effective to adopt a configuration in which the reflective region 30Aa2 for illuminating the short-distance road surface is formed on the reflective surface 30Aa of the first reflector 30A as in the present embodiment. Further, by adopting a configuration in which the second reflector 30B is arranged to be positioned between the first light emitting elements 20A and the second light emitting elements 20B as in the present embodiment, the first and second reflectors 30A, 30B can be arranged with high space efficiency.

In addition, in the present embodiment, since the first and second reflectors 30A, 30B are integrally formed as the reflector 30, the number of parts of the vehicular lamp 10 can be reduced.

Further, in the present embodiment, the four first light emitting elements 20A are mutually arranged at intervals. Therefore, the basic light distribution pattern PLO of the low-beam light distribution pattern PL can be formed as a light distribution pattern having large left and right diffusion angles, and the short-distance light distribution pattern PLa formed at the same time also can be formed as a light distribution pattern having relatively large left and right diffusion angles, and thus it is possible to sufficiently ensure visibility in front of the vehicle during the low-beam irradiation. On the other hand, since the four second light emitting elements 20B are mutually closely arranged, the additional light distribution pattern PA formed during the high-beam irradiation can be formed as a bright light distribution pattern, and thus the high-beam light distribution pattern PH can be made excellent in distant visibility.

In particular, since the vehicular lamp 10 according to the present embodiment is configured as a headlight for a two-wheel vehicle, the short-distance road surface in front of the lamp can be easily visually confirmed up to a region immediately before the two-wheel vehicle 2, and thus it is extremely effective to adopt the above configuration.

Although in the above embodiment, it is described that the short-distance light distribution pattern PLa is formed as a horizontally long light distribution pattern, the short-distance light distribution pattern PLa also can be formed as a light distribution pattern having a shape other than the horizontally long shape. In a case where the short-distance light distribution pattern PLa is formed as the light distribution pattern having a shape other than the horizontally long shape, a specific light irradiation range on the short-distance road surface within 5 m in front of the lamp is not particularly limited. The short-distance light distribution pattern PLa may be formed as a light distribution pattern that illuminates only the short-distance road surface within 5 m in front of the lamp, and may be formed as a light distribution pattern that illuminates a wider region including the short-distance road surface.

In the above embodiment, it is described that the light diffusing treatment applied to the reflective region 30Aa2 of the first reflector 30A is performed by using the emboss processing E. However, even in a case where a light diffusing treatment using a processing (for example, a frosting processing or the like) other than the emboss processing E is adopted, it is possible to diffuse the reflective light from the reflective region 30Aa2 in all directions, and thus it is possible to sufficiently ensure the light diffusing function.

Although in the above embodiment, it is described that the four first light emitting elements 20A and the four second light emitting elements 20B are arranged in the left-right direction as the light source 20, other numbers and arrangements may be adopted.

Although in the above embodiment, it is described that the vehicular lamp 10 is configured as a headlight for a two-wheel vehicle, in a case where the vehicular lamp 10 is configured as a headlight for a four-wheel vehicle such as a one-box car and a truck, it is also possible to obtain substantially the same operations and effects as those of the above embodiment by adopting a configuration similar to that of the above embodiment. In addition to the headlamp, it is also possible to adopt a configuration similar to that of the above embodiment in a fog lamp for illuminating the front of the vehicle, a cornering lamp for illuminating a diagonally forward side or sides of the vehicle, or the like.

In addition, the vehicular lamp 10 according to the present embodiment is configured to radiate light from the light source 20 toward the front of the lamp via the projection lens 40. Specifically, the projection lens 40 includes the tubular portion 44 extending toward the rear of the lamp. The projection lens 40 is supported by the heat sink 50 serving as the light source support member at the rear end of the tubular portion 44. The light shielding treatment by the formation of the black coating film 46 is applied to the outer peripheral surface of the tubular portion 44. Therefore, the following operations and effects can be obtained.

That is, since the projection lens 40 is supported by the heat sink 50 at the rear end of the tubular portion 44, a member for supporting the projection lens 40, such as the bracket unit in the related art, is not necessary, and therefore, the number of parts can be reduced.

In addition, since the light shielding treatment is applied to the tubular portion 44 of the projection lens 40, in a case where the vehicular lamp 10 is observed, an internal space (that is, the housing 12) of the tubular portion 44 can be prevented from being seen. Therefore, the appearance of the lamp can be ensured without requiring the arrangement of the cover member such as the extension in the related art.

As described above, according to the present embodiment, the vehicular lamp 10 that includes the projection lens 40 can ensure the appearance of the lamp by having an inexpensive and compact configuration.

In addition, in the present embodiment, since the light shielding treatment is applied over the entire periphery of the tubular portion 44, even in a case where the vehicular lamp 10 is observed from any direction, the internal space of the tubular portion 44 can be prevented from being seen.

Further, in the present embodiment, since the light shielding treatment is applied on the outer peripheral surface of the tubular portion 44, the work of applying the light shielding treatment can be easily performed.

Further, in the present embodiment, the four first light emitting elements 20A configured to be lighted during the low-beam irradiation and the four second light emitting elements 20B configured to be additionally lighted during the high-beam irradiation are provided as the light source 20. The first light emitting elements 20A and the second light emitting elements 20B are supported by the heat sink 50 in a state of being mounted on the common substrate 22, and thus the number of parts can be minimized and then the above operations and effects can be obtained.

Further, in the present embodiment, since the annular protrusion 44B is formed in the rear end of the tubular portion 44, and the annular recess 52 configured to be engaged with the annular protrusion 44B is formed in the heat sink 50, the projection lens 40 can be reliably supported by the heat sink 50, and the airtightness in the housing 12 can be easily ensured.

In addition, in the present embodiment, the pair of left and right positioning pins 52d, 52e are formed in the heat sink 50, as the protrusion extending toward the front of the lamp, and the through hole 44Ad and the notch portion 44Ab serving as an engagement portion configured to be engaged with the pair of left and right positioning pins 52d, 52e are formed in the projection lens 40, and thus it is possible to reliably position the heat sink 50 and the projection lens 40.

In addition, since the vehicular lamp 10 is configured as a headlight for a two-wheel vehicle, it is possible to easily adopt a lamp configuration in which the projection lens 40 is exposed to an external space as it is, without providing an outer cover or the like as in the present embodiment.

In the vehicular lamp 10 according to the present embodiment, the cover member surrounding the projection lens 40 on the front side of the lamp such as the extension in the related art, is not arranged. However, as illustrated in FIG. 3, the cover member 104 for covering, from the front side of the lamp, the outer peripheral flange 44A of the tubular portion 44 of the projection lens 40 can be attached. Accordingly, it is possible to prevent, from being seen from the outside of the lamp, screw-fixing structures to the heat sink 50 at the two left and right positions of the projection lens 40.

From the viewpoint of the importance placed on only the original purpose of preventing the internal space of the tubular portion 44 from being seen in a case where the vehicular lamp 10 is observed, it is also possible to reduce the number of parts by adopting a configuration in which such a cover member 104 is not attached.

Although in the above embodiment, it is described that the light shielding treatment is performed by forming the black coating film 46, it is also possible to adopt a configuration in which the light shielding treatment is performed by forming, instead of the black coating film 46, a coating film of a color other than black, a plating, a metal deposition film, or the like.

Although in the above embodiment, it is described that the light shielding treatment is applied to the outer peripheral surface of the tubular portion 44, it is also possible to adopt a configuration in which the light shielding treatment is applied to an inner peripheral surface of the tubular portion 44.

Although in the above embodiment, it is described that the four first light emitting elements 20A and the four second light emitting elements 20B are arranged in the left-right direction as the light source 20, other numbers and arrangements may be adopted.

Although in the above embodiment, it is described that the light from the light source 20, which is reflected by the reflector 30, and the direct light from the light source 20 are made incident on the projection lens 40, it is also possible to adopt a configuration in which only one of the light from the light source 20, which is reflected by the reflector 30, and the direct light from the light source 20 is made incident on the projection lens 40.

Although in the above embodiment, it is described that the vehicular lamp 10 is configured as a headlight for a two-wheel vehicle, in a case where the vehicular lamp 10 is configured as a headlight for a four-wheel vehicle such as a one-box car and a truck, it is also possible to obtain substantially the same operations and effects as those of the above embodiment by adopting a configuration similar to that of the above embodiment. In addition to the headlamp, it is also possible to adopt a configuration similar to that of the above embodiment in a fog lamp for illuminating the front of the vehicle, a cornering lamp for illuminating a diagonally forward side or sides of the vehicle, or the like.

Further, the vehicular lamp 10 according to the present embodiment is configured to radiate, toward the front of the lamp via the projection lens 40, light from the light source 20, which is reflected by the reflector 30. Specifically, the reflector 30 and the projection lens 40 are supported by the common heat sink 50, and the first and second light emitting elements 20A, 20B as the light source 20 are also supported by the heat sink 50 via the substrate 22. Therefore, it is possible to provide a lamp configuration capable of sufficiently ensuring a positional relation accuracy between the first and second light emitting elements 20A, 20B mounted on the substrate 22, and the reflector 30 and the projection lens 40.

Further, the first and second light emitting elements 20A, 20B are arranged such that the light emitting surfaces 20Aa, 20Ba of the first and second light emitting elements 20A, 20B are inclined obliquely upward toward the front of the lamp. Therefore, it is possible to efficiently make not only the reflective light from the first reflector 30A but also the direct light from the first and second light emitting elements 20A, 20B incident on the projection lens 40, and thus the lamp efficiency can be improved.

Along with this, the substrate 22 on which the first and second light emitting elements 20A, 20B are mounted is arranged in a state of being inclined in a rear-up manner with respect to the horizontal plane. Further, the substrate 22 is supported by the heat sink 50 in the state of being pressed against the heat sink 50 from the front side of the lamp by the reflector 30. Therefore, the first and second light emitting elements 20A, 20B and the reflector can be arranged with high positional accuracy with respect to the heat sink 50, and thus the light distribution performance of the lamp can be sufficiently ensured.

As described above, according to the present embodiment, the vehicular lamp 10 that includes the projection lens 40 can improve the lamp efficiency and then sufficiently ensure the light distribution performance of the lamp.

In addition, in the present embodiment, the positioning pin 54e extending toward the front of the lamp is formed in the heat sink 50. On the other hand, the insertion hole 22c for inserting the positioning pin 54e is formed in the substrate 22, and the pin insertion hole 34b serving as the engagement portion configured to be engaged with the positioning pin 54e is formed in the reflector 30. Therefore, the positioning accuracy of the first and second light emitting elements 20A, 20B and the reflector 30 with respect to the heat sink 50 can be improved, and thus the light distribution performance of the lamp can be improved.

Further, the insertion hole 22c formed in the substrate 22 is implemented by a long hole extending in the longitudinal direction of the lamp. Therefore, it is possible to easily perform the insertion of the positioning pin 54e to the insertion hole 22c, and then to improve the positioning accuracy of the substrate 22 and the reflector 30 with respect to the heat sink 50 in the left-right direction. On the other hand, the positioning accuracy can be ensured by the pressing of the substrate 22 against the heat sink 50 by the reflector 30 in the longitudinal direction of the lamp.

Further, the substrate 22 has a configuration in which, in a case where the substrate 22 is pressed against the heat sink 50 by the reflector 30, the rear end surface 22b abuts against the positioning beam portions 54d of the heat sink 50 in a state where the rear end wall of the insertion hole 22c is engaged with the positioning pin 54e. Therefore, the positioning accuracy of the substrate assembly 60 in the longitudinal direction of the lamp can be improved.

That is, in the present embodiment, a positioning pin 54e and the positioning beam portions 54d of the heat sink 50 is included in the positioning portion for positioning the substrate 22 in the longitudinal direction of the lamp, together with the substrate abutting portion 34c of the reflector 30 and the substrate support surface 54a of the heat sink 50.

In addition, in the substrate support portion 54 of the heat sink 50, the substrate support surface 54a is implemented by a flat surface slightly protruding from a peripheral region of the substrate support surface 54a. Therefore, the substrate 22 can be reliably in surface contact with the substrate support surface 54a, and the rear end surface 22b of the substrate 22 can be reliably abutted against the positioning beam portions 54d. Accordingly, the positioning accuracy of the first and second light emitting elements 20A, 20B and the reflector 30 with respect to the heat sink 50 can be further improved.

Further, in the present embodiment, in a case where the substrate 22 is placed on the substrate support surface 54a, the pair of left and right positioning protrusions 54b, 54c and the pair of left and right positioning beam portions 54d formed on the substrate support portion 54 of the heat sink 50 are engaged with the front end surface 22a and the rear end surface 22b of the substrate 22, and thus the guide function is performed. Therefore, the work of placing the substrate 22 on the substrate support surface 54a and abutting the rear end surface 22b against the positioning beam portions 54d can be easily performed.

Although in the above embodiment, it is described that the four first light emitting elements 20A and the four second light emitting elements 20B are arranged in the left-right direction as the light source 20, other numbers and arrangements may be adopted.

Although in the above embodiment, it is described that the vehicular lamp 10 is configured as a headlight for a two-wheel vehicle, in a case where the vehicular lamp 10 is configured as a headlight for a four-wheel vehicle such as a one-box car and a truck, it is also possible to obtain substantially the same operations and effects as those of the above embodiment by adopting a configuration similar to that of the above embodiment. In addition to the headlamp, it is also possible to adopt a configuration similar to that of the above embodiment in a fog lamp for illuminating the front of the vehicle, a cornering lamp for illuminating a diagonally forward side or sides of the vehicle, or the like.

In addition, the vehicular lamp 10 according to the present embodiment is configured to radiate, toward the front of the lamp via the projection lens 40, the light from the first and second light emitting elements 20A, 20B, which is reflected by the first and second reflectors 30A, 30B. Specifically, the common substrate 22, on which the first and second light emitting elements 20A, 20B are mounted, is arranged in a state where each of the light emitting surfaces 20Aa, 20Ba of the first and second light emitting elements 20A, 20B is inclined obliquely upward or obliquely downward toward the front of the lamp (that is, the state of being inclined in a rear-up manner with respect to the horizontal plane). The second reflector 30B is arranged to be positioned between the first light emitting elements 20A and the second light emitting elements 20B arranged at the positions away from the first light emitting elements 20A to the front side of the lamp. Therefore, the following operations and effects can be obtained.

That is, the light emitting surfaces 20Aa, 20Ba of the first and second light emitting elements 20A, 20B are inclined obliquely upward toward the front of the lamp. Therefore, the reflective light from the first and second reflectors 30A, 30B and the direct light from the first and second light emitting elements 20A, 20B can be made incident on the projection lens 40 with good balance, and thus the lamp efficiency can be improved.

In addition, the second reflector 30B is arranged between the first light emitting elements 20A and the second light emitting elements 20B. Therefore, a space for the arrangement of the second reflector 30B can be minimized, and then the light from the second light emitting elements 20B can be efficiently reflected toward the projection lens 40 by the second reflector 30B at a position close to a direction perpendicular to the light emitting surfaces 20Ba, and in this regard, the lamp efficiency can also be improved.

As described above, according to the present embodiment, the lamp efficiency can be improved in a case where the vehicular lamp 10 that includes the projection lens 40 has a configuration in which the light from the first and second light emitting elements 20A, 20B, which is reflected by the first and second reflectors 30A, 30B, is made incident on the projection lens 40.

In addition, in the present embodiment, since the first and second reflectors 30A, 30B are integrally formed, the number of parts of the lamp can be reduced.

Further, in the present embodiment, the reflective surface 30Aa of the first reflector 30A is formed to have a larger size than the reflective surface 30Ba of the second reflector 30B. Therefore, the first and second reflectors 30A, 30B can be efficiently arranged in a limited space.

In addition, in the present embodiment, the first reflector 30A is arranged to cover the first light emitting elements 20A from above. Therefore, by using the light from the first and second light emitting elements 20A, 20B, which is reflected by the first and second reflectors 30A, 30B, the horizontally long light distribution pattern can be vertically formed in two stages.

The vehicular lamp 10 according to the present embodiment has a configuration capable of selectively performing the low-beam irradiation and the high-beam irradiation. The vehicular lamp 10 according to the present embodiment further has a configuration in which the first light emitting elements 20A are lighted during the low-beam irradiation, and the second light emitting elements 20B are additionally lighted during the high-beam irradiation. Therefore, the following operations and effects can be obtained.

That is, the low-beam light distribution pattern PL can be easily formed by radiating the direct light from the first light emitting elements 20A and the reflective light from the first reflector 30A toward the front of the lamp via the projection lens 40. Further, the additional light distribution pattern PA, which is added to the low-beam light distribution pattern PL in a case where the high-beam light distribution pattern PH is formed, can be easily formed by radiating the direct light from the second light emitting elements 20B and the reflective light from the second reflector 30B toward the front of the lamp via the projection lens 40.

In addition, the light from the first light emitting elements 20A, which is reflected by the first reflector 30A, forms the short-distance light distribution pattern PLa as a part of the low-beam light distribution pattern PL. Therefore, it is possible to easily illuminate the road surface in front of the lamp up to the short-distance region.

Although in the above embodiment, it is described that the four first light emitting elements 20A and the four second light emitting elements 20B are arranged in the left-right direction as the light source 20, other numbers and arrangements may be adopted.

Although in the above embodiment, it is described that the vehicular lamp 10 is configured as a headlight for a two-wheel vehicle, in a case where the vehicular lamp 10 is configured as a headlight for a four-wheel vehicle such as a one-box car and a truck, it is also possible to obtain substantially the same operations and effects as those of the above embodiment by adopting a configuration similar to that of the above embodiment. In addition to the headlamp, it is also possible to adopt a configuration similar to that of the above embodiment in a fog lamp for illuminating the front of the vehicle, a cornering lamp for illuminating a diagonally forward side or sides of the vehicle, or the like.

Next, modifications of the above embodiment will be described.

First, a first modification of the above embodiment will be described.

FIG. 13 is a diagram, similar to FIG. 4, that illustrates a vehicular lamp 110 according to the present modification.

As illustrated in FIG. 13, although a basic configuration according to the present modification is the same as that of the above embodiment, a configuration of a projection lens 140 is partially different from that of the above embodiment.

That is, in the present modification, the projection lens 140 includes a lens body 142 and a tubular portion 144. The same black coating film 46 as in the above embodiment is formed on an outer peripheral surface of the lens body 142. Further, in the present modification, the lens body 142 of the projection lens 140 is configured as a plano-convex aspherical lens having a front surface formed in a convex shape, but the present modification is different from the above embodiment in that a plurality of diffusion lens elements 142s are formed on a rear surface of the lens body 142.

Each of the plurality of diffusion lens elements 142s is configured as a convex cylindrical lens extending in the vertical direction, and thus the reflective light from the reflector 30 is made incident on the lens body 142 as light that diffuses in the left-right direction in some degree.

By adopting the configuration according to the present modification, the following operations and effects can be obtained.

That is, each of the basic light distribution pattern PL0 and the short-distance light distribution pattern PLa formed during the low-beam irradiation and the additional light distribution pattern PA additionally formed during the high-beam irradiation can be formed as a light distribution pattern having larger left and right diffusion angles than the above embodiment in some degree, and can be formed as a light distribution pattern having smaller light distribution unevenness than the above embodiment.

In the first modification, it is described that each of the plurality of diffusion lens elements 142s is configured as a convex cylindrical lens extending in the vertical direction. However, each of the diffusion lens elements 142s may be configured as a concave cylindrical lens or a waveform cylindrical lens in which irregularities are alternately arranged. Further, the plurality of diffusion lens elements 142s may be formed in a partial region on a rear surface of the lens body 142.

Next, a second modification of the above embodiment will be described.

FIG. 14 is a diagram, similar to FIG. 2, that illustrates a vehicular lamp 210 according to the present modification.

As illustrated in FIG. 14, although a basic configuration according to the present modification is the same as that of the above embodiment, a configuration of a reflector 230 is partially different from that of the above embodiment.

That is, in the present modification, a first reflector 230A and a second reflector 230B are provided as the reflector 230, and a reflective region 230Aa2 for illuminating the short-distance road surface in front of the lamp is formed in the first reflector 230A. However, the present modification is different from the above embodiment in that the light diffusing treatment applied to the reflective region 230Aa2 is performed by forming a plurality of diffuse reflection elements 230Aa2s.

Each of the plurality of diffuse reflection elements 230Aa2s is configured as a convex cylindrical reflection element having a thin width and extending in the vertical direction in the front view of the lamp, and thus the emitted light from the four first light emitting elements 20A is reflected as light that diffuses in the left-right direction in some degree.

By adopting the configuration according to the present modification, the following operations and effects can be obtained.

That is, since the four first light emitting elements 20A are mutually arranged at intervals in the left-right direction, the light distribution unevenness is likely to occur in the left-right direction in the short-distance light distribution pattern PLa (see FIGS. 12A and 12B) formed on the short-distance road surface in front of the lamp. However, by adopting a configuration in which the plurality of diffuse reflection elements 230Aa2s that diffuse and reflect the emitted light from the four first light emitting elements 20A in the left-right direction are formed in the reflective region 230Aa2 as in the present modification, the occurrence of such light distribution unevenness can be effectively limited.

Although in the above second modification, it is described that each of the plurality of diffuse reflection elements 230Aa2s is configured as a convex cylindrical reflection element extending in the vertical direction, each of the plurality of diffuse reflection elements 230Aa2s may be configured as a concave cylindrical reflection element or a waveform cylindrical reflection element in which irregularities are alternately arranged.

Next, a third modification of the above embodiment will be described.

FIG. 15 is a diagram, similar to FIG. 2, that illustrates a vehicular lamp 310 according to the present modification.

As illustrated in FIG. 15, although a basic configuration according to the present modification is the same as that of the above embodiment, a configuration of a projection lens 340 is partially different from that of the above embodiment.

That is, in the present modification, the projection lens 340 includes a lens body 342 and a tubular portion 344, and a black coating film 346 similar to that of the above embodiment is formed on an outer peripheral surface of the tubular portion 344 in a range from a connection position with a front end surface 344a to a connection position with an outer peripheral flange 344A of the tubular portion 344.

However, in the present modification, the formation range of the black coating film 346 is not the entire periphery of the outer peripheral surface of the tubular portion 344, but is limited to an upper region of the outer peripheral surface of the tubular portion 344 (specifically, a region positioned above the horizontal plane including the optical axis Ax).

By adopting the configuration according to the present modification, the following operations and effects can be obtained.

That is, by adopting a configuration in which the black coating film 346 is formed only in the upper region of the outer peripheral surface of the tubular portion 344, it is possible to more easily perform the work of applying the light shielding treatment.

Even in a case where the configuration according to the present modification is adopted, in a case where the vehicular lamp 310 is observed obliquely above (that is, from a general observation direction), an internal space of the tubular portion 344 can be prevented from being seen by the black coating film 346 formed in the upper region of the outer peripheral surface of the tubular portion 344.

Next, a fourth modification of the above embodiment will be described.

Figure 16:
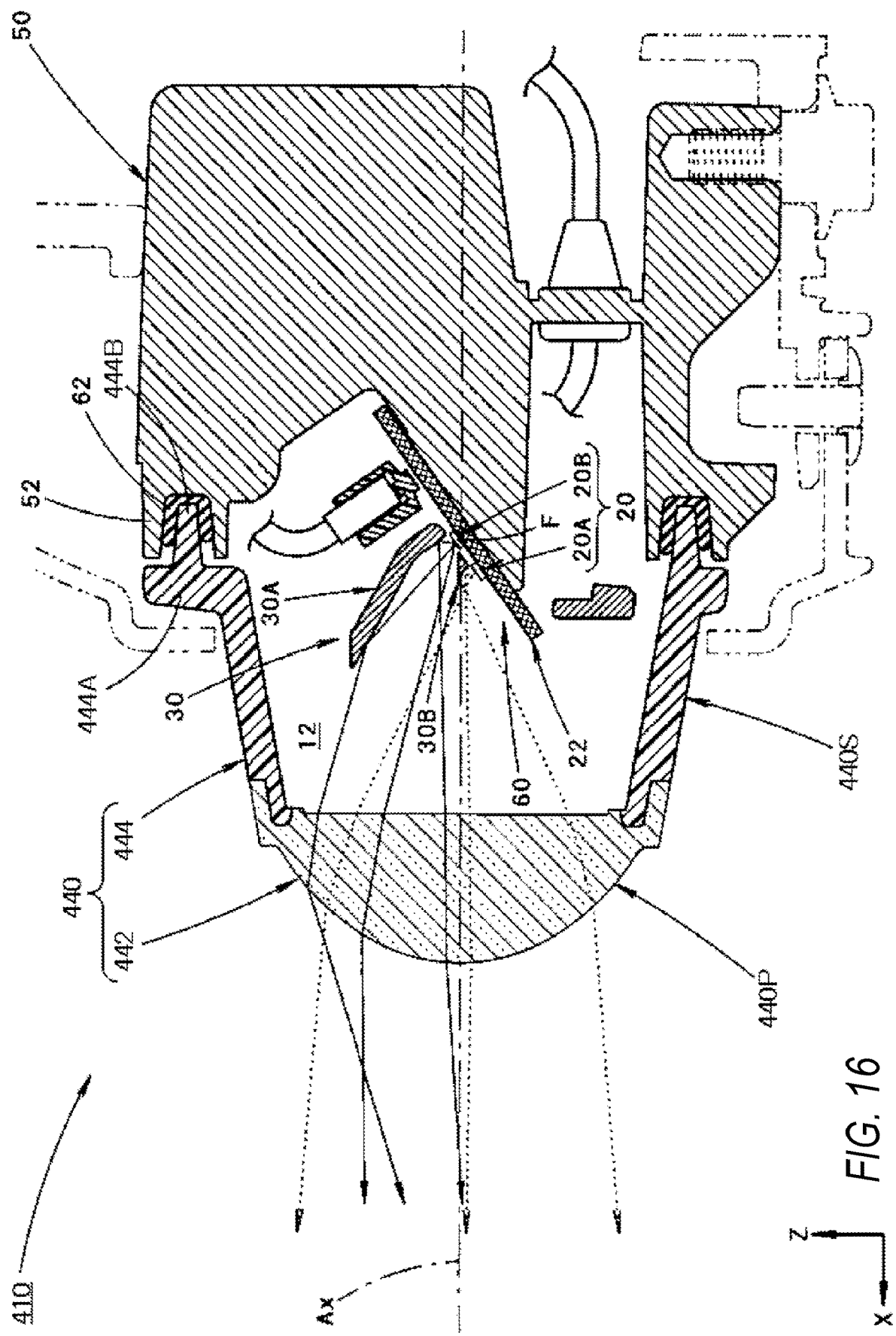
FIG. 16, is similar to FIG. 3, is a diagram that illustrates a fourth modification of the above embodiment.

FIG. 16 is a diagram, similar to FIG. 3, that illustrates a vehicular lamp 410 according to the present modification.

As illustrated in FIG. 16, although a basic configuration according to the present modification is the same as that of the above embodiment, a configuration of a projection lens 440 is partially different from that of the above embodiment.

That is, although the projection lens 440 according to the present modification includes a lens body 442 and a tubular portion 444, the present modification is different from the above embodiment in that the projection lens 440 is configured as a two-color molded product.

Specifically, in the projection lens 440, a substantially entire region of the lens body 442 is configured as a primary molded product 440P made of a transparent resin (for example, made of a colorless and transparent PC resin or the like), and a substantially entire region of the tubular portion 444 (that is, a region including an outer peripheral flange 444A and an annular protrusion 444B) is configured as a secondary molded product 440S made of an opaque resin (for example, made of a black PC resin or an ABS resin). Further, in the projection lens 440, an outer peripheral edge of the lens body 442 and a front end of the tubular portion 444 are configured as an overlapped portion of the primary molded product 440P and the secondary molded product 440S.

In the present modification, the substantially entire region of the tubular portion 444 is configured using the secondary molded product 440S made of the opaque resin, and thus the light shielding treatment using the black coating film 46 or the like as in the above embodiment is not applied to the outer peripheral surface of the tubular portion 444.

By adopting the configuration according to the present modification, the following operations and effects can be obtained.

That is, the projection lens 440 according to the present modification has a configuration in which the light shielding treatment is not applied to the tubular portion 444 since the substantially entire region of the tubular portion 444 is configured as the opaque two-color molded product. Therefore, it is possible to obtain the same operations and effects as in the above embodiment without applying the light shielding treatment using the black coating film 46 or the like as in the above embodiment to the outer peripheral surface of the tubular portion 444.

Next, a fifth modification of the above embodiment will be described.

Figure 17:
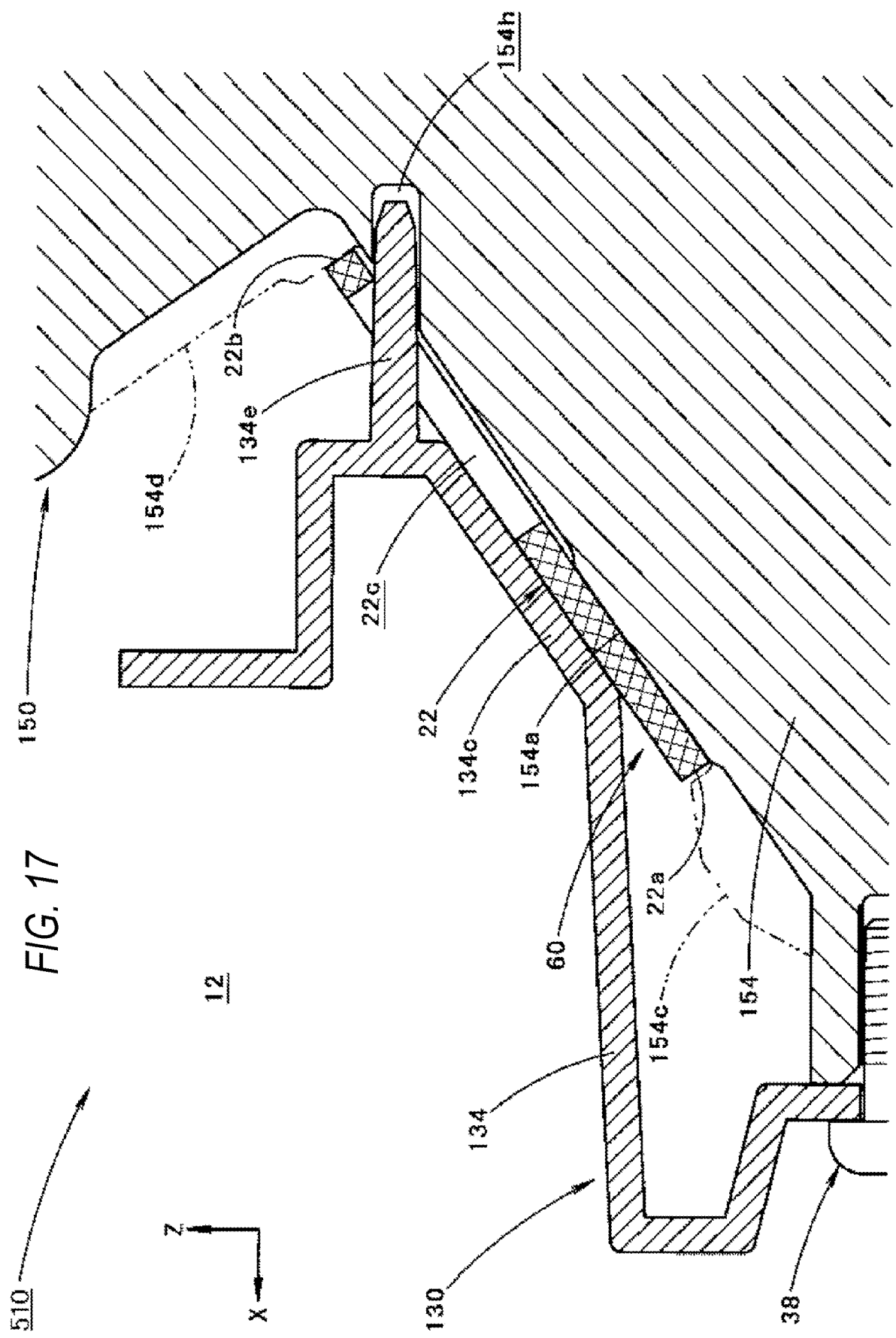
FIG. 17, which is similar to FIG. 11, is a diagram that illustrates a fifth modification of the above embodiment.

FIG. 17 is a diagram, similar to FIG. 11, that illustrates essential parts of a vehicular lamp 510 according to the present modification.

As illustrated in FIG. 17, although a basic configuration according to the present modification is the same as that of the above embodiment, a support structure using a heat sink 150 for the substrate assembly 60 and a reflector 130 is partially different from that of the above embodiment.

That is, in the present modification, the substrate 22 is supported by the heat sink 150 in a state of being pressed, from the front side of the lamp, against a substrate support surface 154a of a substrate support portion 154 of the heat sink 150, by a substrate abutting portion 134c formed in a peripheral structure portion 134 of the reflector 130.

However, in the present modification, a positioning pin 134e extending toward the rear of the lamp is formed in the peripheral structure portion 134 of the reflector 130, and a positioning hole 154h serving as an engagement portion is formed in the substrate support portion 154 of the heat sink 150. Then, in a case where the positioning pin 134e is inserted into the positioning hole 154h from the front side of the lamp through the insertion hole 22c of the substrate 22, the substrate assembly 60 and the reflector 130 are positioned with respect to the heat sink 150.

In the present modification, a positioning protrusion 154c and a positioning beam portion 154d are formed in the substrate support portion 154 of the heat sink 150. Further, in a case where the substrate 22 is placed on the substrate support surface 154a, the positioning protrusion 154c is engaged with the front end surface 22a of the substrate 22, and the positioning beam portion 154d is engaged with the rear end surface 22b of the substrate 22, and thus the guide function is performed.

Further, in a case where the positioning pin 134e is inserted into the positioning hole 154h through the insertion hole 22c, the rear end surface 22b of the substrate 22 abuts against the positioning beam portion 154d in a state where the positioning pin 134e is engaged with the rear end wall of the insertion hole 22c. Accordingly, the substrate assembly 60 and the reflector 130 are reliably positioned with respect to the heat sink 150 in the longitudinal direction of the lamp.

That is, in the present modification, the positioning pin 134e and the positioning beam portion 154d of the heat sink 150 is included in the positioning portion for positioning the substrate 22 in the longitudinal direction of the lamp, together with the substrate abutting portion 134c of the reflector 130 and the substrate support surface 154a of the heat sink 150.

Even in a case where the configuration according to the present modification is adopted, the positioning accuracy of the substrate assembly 60 and the reflector 130 with respect to the heat sink 150 can be improved, and thus the lamp light distribution performance of the vehicular lamp 110 can be improved.

Next, a sixth modification of the above embodiment will be described.

Figure 18:
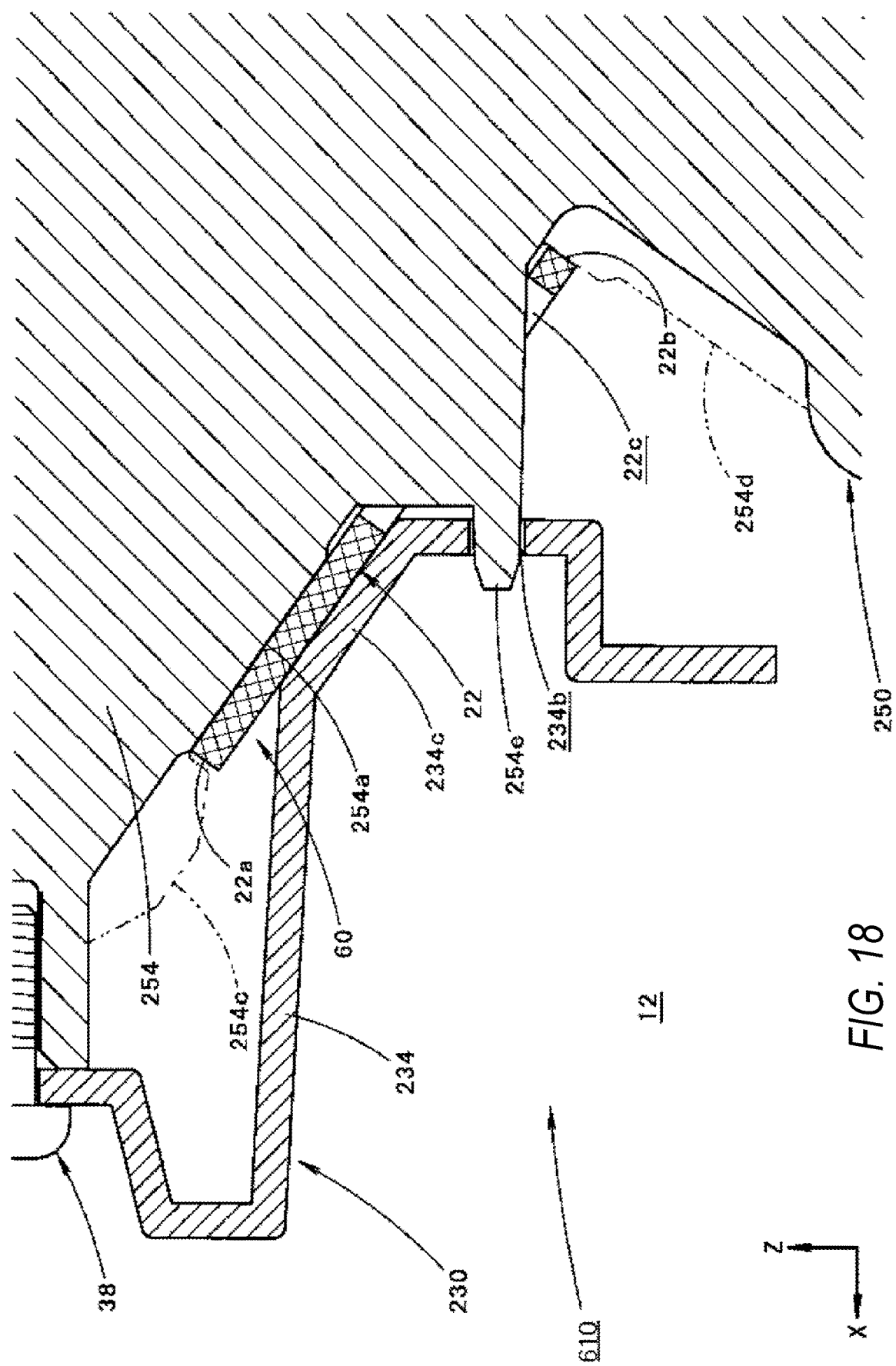
FIG. 18, which is similar to FIG. 11, is a diagram that illustrates a sixth modification of the above embodiment.

FIG. 18 is a diagram, similar to FIG. 11, that illustrates essential parts of a vehicular lamp 610 according to the present modification.

As illustrated in FIG. 18, although a basic configuration according to the present modification is the same as that of the above embodiment, a support structure using a heat sink 250 for the substrate assembly 60 and the reflector 230 is vertically inverted with respect to that of the above embodiment.

That is, in the present modification, the first and second light emitting elements 20A, 20B (not shown) are arranged in a state where the light emitting surfaces 20Aa, 20Ba (not shown) of the first and second light emitting elements 20A, 20B are inclined obliquely downward toward the front of the lamp, and the substrate 22 on which the first and second light emitting elements 20A, 20B are mounted is arranged in a state of being inclined in a front-up manner with respect to the horizontal plane.

Further, in the present modification, the substrate 22 is supported by the heat sink 250 in a state of being pressed against a substrate support surface 254a of a substrate support portion 254 of the heat sink 250 from the front side of the lamp by a substrate abutting portion 234c formed in a peripheral structure portion 234 of the reflector 230.

A positioning pin 254e extending toward the front of the lamp is formed in the substrate support portion 254 of the heat sink 250. On the other hand, a pin insertion hole 234b serving as an engagement portion that is engaged with the positioning pin 254e inserted into the insertion hole 22c of the substrate 22 is formed in the peripheral structure portion 234 of the reflector 230.

In the present modification, a positioning protrusion 254c and a positioning beam portion 254d are formed in the heat sink 250. Further, in a case where the substrate 22 is placed on the substrate support surface 254a, the positioning protrusion 254c is engaged with the front end surface 22a of the substrate 22, and the positioning beam portion 254d is engaged with the rear end surface 22b of the substrate 22, and thus the guide function is performed.

Further, in a case where the positioning pin 254e is inserted into the pin insertion hole 234b through the insertion hole 22c, the rear end surface 22b of the substrate 22 abuts against the positioning beam portion 254d in a state where the positioning pin 254e is engaged with the rear end wall of the insertion hole 22c. Accordingly, the substrate assembly 60 and the reflector 230 are reliably positioned with respect to the heat sink 250 in the longitudinal direction of the lamp.

Even in a case where the configuration according to the present modification is adopted, the positioning accuracy of the substrate assembly 60 and the reflector 230 with respect to the heat sink 250 can be improved, and thus the lamp light distribution performance of the vehicular lamp 610 can be improved.

Next, a seventh modification of the above embodiment will be described.

FIG. 19 is a diagram, similar to FIG. 6, that illustrates a vehicular lamp 710 according to the present modification.

As illustrated in FIG. 19, although a basic configuration according to the present modification is the same as that of the above embodiment, the arrangement of the substrate assembly 60 and a reflector 730 is different from that of the above embodiment, and configurations of the reflector 730 and a heat sink 750 are accordingly partially different from those of the above embodiment.

That is, in the present modification, a support structure by the heat sink 750 for the substrate assembly 60 and the reflector 730 is vertically inverted with respect to that of the above embodiment, and the arrangement of the substrate assembly 60 and the reflector 730 and the configuration of the reflector 730 are partially different from those of the above embodiment.

Specifically, in the present modification, the first and second light emitting elements 20A, 20B are arranged in a state where the light emitting surfaces 20Aa, 20Ba of the first and second light emitting elements 20A, 20B are inclined obliquely downward toward the front of the lamp, and the substrate 22 on which the first and second light emitting elements 20A, 20B are mounted is accordingly arranged in the state of being inclined in a front-up manner with respect to the horizontal plane.

Further, the first and second light emitting elements 20A, 20B are arranged to be positioned above the optical axis Ax of the projection lens 40, and the rear focus F of the projection lens 40 is set at substantially the same position as that of the light emitting surface 20Ba of the second light emitting element 20B in the longitudinal direction of the lamp.

Further, in the present modification, in the reflector 730, a first reflector 730A configured to reflect emitted light from the first light emitting elements 20A toward the projection lens 40, and a second reflector 730B configured to reflect emitted light from the second light emitting elements 20B toward the projection lens 40 are integrally formed. Further, the second reflector 730B is arranged to be positioned between the first light emitting elements 20A and the second light emitting elements 20B, the first reflector 730A is arranged below the first light emitting elements 20A, and a reflective surface 730Aa of the first reflector 730A is formed to have a larger size than a reflective surface 730Ba of the second reflector 730B.

Further, in the present modification, although the heat sink 750 includes a substrate support portion 754 for supporting the substrate 22 of the substrate assembly 60, a substrate support surface 754a of the substrate support portion 754 is implemented by a flat surface extending in a direction inclined in a front-up manner with respect to the horizontal plane.

In addition, the vehicular lamp 710 according to the present modification is configured to form an additional light distribution pattern similar to the additional light distribution pattern PA of the above embodiment during the high-beam irradiation by lighting the first light emitting element 20A, and form a light distribution pattern for the fog lamp by lighting the second light emitting element 20B to radiate downward light from the projection lens 40 toward the front of the lamp.

Even in a case where the configuration according to the present modification is adopted, the lamp efficiency can be improved in a case where the vehicular lamp 710 that includes the projection lens 40 has a configuration in which the light from the first and second light emitting elements 20A, 20B, which is reflected by the first and second reflectors 730A, 730B, is made incident on the projection lens 40.

It should be noted that numerical values shown as specifications in the above embodiment and the modifications thereof are merely examples, and as a matter of course, these numerical values may be set to different values as appropriate.

Further, the present invention is not limited to the configurations described in the above embodiment and the modifications thereof, and a configuration added with various other changes may be adopted.

The present application is based on Japanese Patent Application No. 2021-033900 filed on Mar. 3, 2021, Japanese Patent Application No. 2021-033901 filed on Mar. 3, 2021, Japanese Patent Application No. 2021-033902 filed on Mar. 3, 2021, and Japanese Patent Application No. 2021-033903 filed on Mar. 3, 2021, and the contents thereof are incorporated herein by reference.

The invention claimed is:

1. A vehicular lamp comprising:
   a light source;
   a reflector; and
   a projection lens,
   wherein the vehicular lamp is configured to radiate, toward front of the vehicular lamp via the projection lens, light from the light source, the light being reflected by the reflector,
   a reflective surface of the reflector includes a reflective region configured to illuminate a short-distance road surface within 5 m in front of the vehicular lamp, and
   a light diffusing treatment for diffusing and reflecting emitted light from the light source is applied to the reflective region,
   wherein the light source includes a light emitting element mounted on a substrate,
   the substrate is arranged in a state where a light emitting surface of the light emitting element is inclined obliquely upward toward the front of the vehicular lamp, and
   the reflector is arranged to cover the light emitting element from above,
   wherein the light emitting element includes:
      a first light emitting element configured to be lighted during low-beam irradiation; and
      a second light emitting element configured to be additionally lighted during high-beam irradiation,
      the second light emitting element is arranged at a position away from the first light emitting element to a front side of the vehicular lamp, and
   the reflector includes:
      a first reflector configured to reflect, toward the projection lens, emitted light from the first light emitting element; and
      a second reflector configured to reflect, toward the projection lens, emitted light from the second light emitting element,
   the second reflector is arranged at a position between the first light emitting element and the second light emitting element, and
   the reflective region is formed on a reflective surface of the first reflector.

2. The vehicular lamp according to claim 1,
wherein the first reflector and the second reflector are integrally formed.

3. The vehicular lamp according to claim 1,
wherein the first light emitting element and the second light emitting element are mounted on a common substrate.

4. The vehicular lamp according to claim 1,
wherein the vehicular lamp is configured as a headlight for a two-wheel vehicle.

* * * * *